United States Patent [19]
Koizumi et al.

[11] Patent Number: 6,151,552
[45] Date of Patent: Nov. 21, 2000

[54] ROUTE GUIDANCE APPARATUS

[75] Inventors: Satoru Koizumi, Torrance, Calif.; Takahisa Tanaka, Nagoya, Japan

[73] Assignee: Denso Corporation, Kariya, Japan

[21] Appl. No.: 09/143,515

[22] Filed: Aug. 28, 1998

[30] Foreign Application Priority Data

| Aug. 28, 1997 | [JP] | Japan | 9-232844 |
| Aug. 29, 1997 | [JP] | Japan | 9-235159 |
| Jan. 27, 1998 | [JP] | Japan | 10-014232 |

[51] Int. Cl.⁷ ............................. G01C 21/00; G06G 7/78
[52] U.S. Cl. ..................... 701/211; 701/207; 701/208; 701/209; 701/212; 340/988; 340/990; 340/995; 73/178 R
[58] Field of Search ............................. 701/200, 207, 701/208, 209, 210, 211, 212; 340/988, 995, 990; 345/428, 439, 353, 357, 333, 352; 73/178 R

[56] References Cited

U.S. PATENT DOCUMENTS

| 5,177,685 | 1/1993 | Davis et al. | 701/211 |
| 5,406,492 | 4/1995 | Suzuki | 701/211 |
| 5,452,217 | 9/1995 | Kishi et al. | 701/211 |
| 5,629,854 | 5/1997 | Schulte | 701/200 |
| 5,654,892 | 8/1997 | Fujii | 701/211 |
| 5,687,083 | 11/1997 | Kishi et al. | 701/200 |
| 5,729,109 | 3/1998 | Kaneko et al. | 701/200 |
| 5,793,631 | 8/1998 | Ito et al. | 701/211 |
| 5,799,264 | 8/1998 | Mizutani et al. | 701/211 |
| 5,848,364 | 12/1998 | Ohashi | 340/995 |
| 5,925,090 | 7/1999 | Poonsaengsathit | 701/211 |
| 5,938,718 | 8/1999 | Morimoto et al. | 701/211 |
| 5,951,621 | 9/1999 | Palalu et al. | 701/211 |
| 6,018,697 | 1/2000 | Morimoto et al. | 701/209 |

FOREIGN PATENT DOCUMENTS

| 59-206710 | 11/1984 | Japan. |
| 6-13973 | 2/1994 | Japan. |
| 7-325999 | 12/1995 | Japan. |
| 8-233588 | 9/1996 | Japan. |
| 9-196694 | 7/1997 | Japan. |
| 97/43600 | 11/1997 | WIPO. |

Primary Examiner—Jacques H. Louis-Jacques
Attorney, Agent, or Firm—Pillsbury Madison & Sutro LLP

[57] ABSTRACT

A route guidance apparatus comprises a guiding device for, every time a turning point for which guidance is to be provided existing on a route for reaching a destination is approached, providing travel guidance for that turning point by at least a voice generated from a voice generating device. In particular, when the turning point for which guidance is to be provided is included in a traffic circle and the route turns from the traffic circle to an exit road toward an outer side thereof at the turning point, the guiding device provides travel guidance specifying how many ahead the exit road to be taken is among exit roads toward the outer side of the traffic circle. As a result, travel guidance with which a user can exit from the traffic circle through a correct exit.

31 Claims, 14 Drawing Sheets

| NODE ID | CONNECTED CIRCLE ATTRIBUTE LINK | CONNECTED EXITABLE LINK | TURN ANGLE OF EXITABLE LINK RELATIVE TO CIRCLE ATTRIBUTE LINK | TURNING POINT DETERMINATION DATA |
|---|---|---|---|---|
| N1 | L1 L2 | | | × |
| N2 | L2 L3 | L10 | +60° | ○ |
| N3 | L3 L4 | L17 | −50° | × |
| N4 | L4 L5 | L12 | +70° | ○ |
| N5 | L5 L6 | | | × |
| N6 | L6 L7 | L14 | +60° | ○ |
| N7 | L7 L8 | L18 | −50° | × |
| N8 | L8 L1 | L16 | +70° | ○ |

LOOP-SHAPED CONNECTING ROAD
GROUND ROAD

ELEVATED ROAD
GROUND ROAD
LOOP-SHAPED CONNECTING ROAD

LOOP-SHAPED CONNECTING ROAD
GROUND ROAD

ROUTE GUIDANCE APPARATUS

CROSS REFERENCE TO RELATED APPLICATION

This application is based upon and claims the benefit of priority of Japanese Patent Applications No. H.9-232844 filed on Aug. 28, 1997, No. H.9-235159 filed on Aug. 29, 1997, and No. H.10-14232 filed on Jan. 27, 1998, the contents of which are incorporated herein by reference.

BACKGROUND OF THE INVENTION

1. Field of the Invention

This invention relates to a route guidance apparatus such as a navigation system.

2. Pelated Art

Navigation systems which detect a present position of a vehicle by means of GPS or the like as the vehicle travels and display that position on a display together with a road map, thereby allowing the vehicle to reach a destination smoothly, are known. Also, navigation systems which obtain a suitable route from the present position to the destination and provide a route guidance are known, and contribute to smoother drives.

Among navigation systems as described above, those which, every time a vehicle reaches a turning point on a route for which guidance is to be provided to the user, provide travel guidance for that turning point with a voice are known. For example those which provide voice guidance as to the distance to a turning point and a direction in which to turn there, like "○○ meters ahead, right turn.", and even provide guidance including the name of the intersection, like "ΔΔ meters ahead, ≡≡≡ Intersection, left turn." are known. By informing the driver of the travel guidance with good timing with a voice in this way, it is not necessary for the user to frequently pay attention to the positional relationship between the present position and the turning point and so on, and thus it is extremely convenient.

As one road system often seen mainly in Europe and America, there is the traffic circle (Traffic Circle: circular intersection, also called a rotary or roundabout). This traffic circle, an example of which is shown in FIG. 7A, is often made up of a plurality of entry roads 102 and a plurality of exit roads 103 connected to a closed circular route 101. For example, when a route guidance apparatus provides voice guidance about a route entering the traffic circle from the direction shown with the arrow A in FIG. 7A and exiting in the direction shown with the arrow B, after the vehicle enters the traffic circle, it is indicated how many ahead is the exit road 103 to be taken. Therefore, in the case of FIG. 7A, because the exit road 103 shown with ② is to be taken, voice guidance is provided like "Please exit on the exit road two ahead.". On the other hand, in the case of a traffic circle having inner side exit roads, as shown in FIG. 7B, when the route guidance apparatus provides voice guidance about a route entering from the direction shown with the arrow A and exiting in the direction shown with the arrow B, because the exit road 103 shown with ③ is to be taken, voice guidance is provided like "Please exit on the exit road three ahead.".

However, among traffic circles actually existing, those having exit roads set on the circle outer side only as shown in FIG. 7A are the vast majority, and traffic circles of a shape having exit roads set on the inner side of the circle also, as shown in FIG. 7B, do not even account for ten percent. Accordingly, as the consciousness of the driver, often it is taken for granted that exit roads are roads exiting to the outer side, and the possibility of missing exit roads to the inner side is high. Therefore, after the vehicle enters the traffic circle, even through it is indicated how many ahead the exit road 103 that is to be taken is, there is a possibility of the vehicle exiting from the wrong exit road 103. That is, in the case shown in FIG. 7B, when the vehicle exits in the direction shown with the arrow B as mentioned above, because the vehicle passes through the exit road 103 shown with ③, the voice guidance "Please exit on the exit road three ahead." is provided. But if attention is only paid to the outer side exit roads 103 then "the exit road three ahead" becomes the exit road 103 shown with ④. As a result, the problem arises that the driver goes past the exit road 103 of ③ on which he should exit and exits on the exit road 103 of ④.

In the meantime, as a route guidance in a conventional map displaying apparatus, normally, a guide route from a present position to a destination is additionally displayed on a map displaying the present position's vicinity of the vehicle. In that display method, by the color of the guide route being made different from the normal road color, it is made easy to see it. Also, at a turning point (here, for example, an intersection) at which a turn should be made on that guide route an enlarged intersection map is displayed to make it possible for the driver to grasp the intersection at which he is to turn next more correctly. In this enlarged intersection map, the intersection and its vicinity map are enlarged and displayed on the screen. The enlarged map has been drawn on a fixed scale such as for example 1/500 and displayed on the display.

As described above, the traffic circle, for example as shown in FIGS. 14A, 14C is made up of a plurality of entrance roads and a plurality of exit roads connected to a closed circular route, and its size (for example the maximum diameter of the circular route) is various. For example the traffic circle shown in FIG. 14A is one of which the circular route part is relatively small. When this is enlarged on a fixed scale as conventional and displayed, there are times when as shown in FIG. 14B a line collapses and it becomes impossible for the user to distinguish the details of the traffic circle depending on the link widths drawn and the like.

On the other hand, the traffic circle shown in FIG. 14C is one of which the circular route part is relatively large. When this is enlarged on the fixed scale and displayed, in this case, it does not happen that the line collapses as shown in FIG. 14B and it becomes possible for the user to distinguish the details of the traffic circle. However, there are cases wherein as shown in FIG. 14D only a part of the traffic circle is displayed. This is because since the connection part between the circular route of the traffic circle and the exit road is taken as an intersection, only the vicinities thereof are displayed. However, when the vehicle travels on the traffic circle, after entering the circular route, it is necessary for the driver to travel recognizing how many ahead the exit road at which a turn should be made is. That is, unless not only the exit road alone but also the relative positional relationships in the entire traffic circle are understood to the driver, there is a possibility of not being able to distinguish which exit road to exit on.

Also, the same kind of problem arises also for loop-shaped connecting roads which connect ground roads and elevated roads in three-dimensional intersection structures. For example, the loop-shaped connecting road is a road such as a so-called rampway through which the vehicle passes when the vehicle proceeds from an ordinary road which is a "ground road" to an expressway which is an "elevated road" (or a Freeway seen in Europe and America).

For example, the loop-shaped connecting road shown in FIG. 17A is one whose loop-shaped part is relatively large. When this is enlarged on the fixed scale and displayed, as shown in FIG. 11B there are cases wherein only a part of the loop shape is displayed. This is because, since vehicles cannot actually pass through the three-dimensional intersection part between the ground road and the elevated road, the loop-shaped connecting road is not taken as an intersection between ordinary roads and it is only displayed as a diagonal branch at the entry part to the loop-shaped connecting road. However, to a driver wanting to proceed to a road connected to the elevated road, there is a possibility of it not being possible to judge whether or not the diagonal branch displayed as shown in FIG. 17B is really a loop-shaped connecting road. In the end, the driver may not understand which branch to turn at.

The "loop-shaped connecting road" referred to here indicates a road, among connecting roads connecting ordinary roads which are "ground roads" and expressways and Freeways which are "elevated roads", having a loop shape such that difference in road direction from the entry angle to the connecting road is equal to or greater than a predetermined angle. As the predetermined angle constituting the condition of the "loop-shaped connecting road", for example about 180 degrees is conceivable. This is because, when the road direction changes more than about 180 degrees, the possibility of it being impossible to judge whether or not a diagonal branch displayed as in FIG. 17B is really a loop-shaped connecting road increases. However, even when the difference of the road direction is less than 180 degrees, if the connecting road has a shape such that the above-mentioned problem arises, that connecting road can also be regarded as a loop-shaped connecting road.

Also, in relation to this kind of problem not only the traffic circles and loop-shaped connecting roads discussed above but also complex intersections must be similarly considered. For example, when a road of a small width and a road of a large width make a "diagonal T intersection" or a "diagonal crossing intersection" and also roads of large widths including those kinds of intersections make a "diagonal crossroads intersection", it is a situation such that a plurality of roads intersect complicatedly within a region of about 100 m in radius. In this case, since there are a plurality of intersections and they are intersecting diagonally and so on, even if the color of the guide route and the color of the ordinary roads are made different and an intersection at which route guidance is to be provided is displayed enlarged, when the vehicle actually travels through the vicinity of that intersection it is difficult for the driver to make out the exact road to be travelled. That is, there is a possibility that the driver can not distinguish which of the roads intersecting complicatedly within the above-mentioned region of about 100 m in radius the guide route is indicating.

SUMMARY OF THE INVENTION

A first object of this invention is to provide a route guidance apparatus which, when providing guidance for an exit road of a traffic circle, can provide guidance matching the sense of the driver and such that the driver can exit from the correct exit road.

A second object of this invention to provide a route guidance apparatus which can automatically change an enlarged intersection view displayed on a screen to a view of a scale suited to actual route guidance.

To achieve the above-mentioned first object, a route guidance apparatus according to the first aspect of the present invention comprises a guiding device for, every time a turning point for which guidance is to be provided existing on a route for reaching a destination is approached, executing travel guidance for that turning point by at least a voice generated from a voice generating device. When the turning point for which guidance is to be provided is included in a traffic circle and the route is an exit road from the traffic circle toward the outer side thereof at the turning point, the guiding device carries out travel guidance specifying how many ahead the exit road on the route is among exit roads toward the outer side of the traffic circle (outer side exit roads).

As described above in the "Related Art", in the traffic circle as shown in FIG. 7B, when the route guidance apparatus provides voice guidance the route entering from the direction shown with the arrow A and exiting in the direction shown with the arrow B, the exit road 103 shown with ③ is to be taken. According to the route guidance apparatus of the present invention, the exit road 103 shown with ② is not counted because it is an exit road toward an inner side of the traffic circle (inner side exit road). Because, as an outer side exit road, the exit road shown with ③ is the one after the exit road shown with ①, the voice guidance "Please exit on the exit road two ahead." is provided. Because most traffic circles have exit roads set only on the outer side of the traffic circle as shown in FIG. 7A, as the consciousness of the driver, often it is taken for granted that exit roads are roads exiting to the outer side of the traffic circle. Therefore, if the guidance "Please exit on the exit road three ahead." is provided in FIG. 7B, the problem tends to arise that the driver goes past the exit road 103 of ③ on which he should exit and exits on the exit road 103 of ④. Therefore, when attention is only paid to exit roads to the outer side, because the driver a understands that he should exit to the outer side of the traffic circle on the exit road 103 two ahead shown with ③, it is possible to match the sense of the driver and realize guidance with which it is possible for the driver to exit from the correct exit.

When the route at which guidance is to be provided turns to an exit road from the traffic circle toward the inner side thereof, it is only necessary to carry out travel guidance capable of specifying how many ahead the exit road on the route is among such inner side exit roads. In this case, if the driver just understands that the traffic circle is to be taken, the probability of exiting to the outer side exit road is high as described above. Therefore, voice guidance making it clear to exit to the inner side exit road is necessary. It has been described that it is sufficient to carry out travel guidance capable of specifying how many ahead the exit road on the route is among the inner side exit roads. However, when the vehicle is to exit to the inner side exit road of the traffic circle as shown in FIG. 7B, in particular, when entering from the direction shown with the arrow A, it is usual to exit only to the inner side exit road 103 shown with ②. Therefore, for example it may alternatively provide a guidance such as "keep left".

To distinguish between outer side exit roads and inner side exit roads, it is conceivable to do the following. That is, a turn angle having the traffic direction on the circular route constituting the traffic circle as a reference is set for each of the inner and outer side exit roads. On the basis of the turn angle set in this way, either an outer side exit road or an inner side exit road is specified. Because one-way traffic is usually allowed in the traffic circle, forward direction of the traffic may be used as a reference. For example in the case of the traffic circle shown in FIG. 7B, the forward direction of the traffic is counterclockwise. Therefore, because the exit road

103 shown with ① is turning to the right with respect to the forward direction, the angle of turning is shown with a plus A° for example. Because the exit road 103 shown with ② is turning to the left with respect to the forward direction, the angle of turning is shown with minus B°. In this way, it can easily be specified that when the turn angle is plus it shows an outer side exit road and when the turn angle is minus it shows an inner side exit road.

Explaining a more specific apparatus construction of the route guidance apparatus, a route guidance apparatus comprises a present position detecting device for detecting a present position, a destination setting device for setting a destination on the basis of an operation of a user, a route data storing device for storing route data, a route selecting device for selecting route data corresponding with a route from the present position detected by the present position detecting device to the destination set by the destination setting device from the route data stored in the route data storing device, and guiding device for, every time a turning point for which guidance is to be provided existing on the route is approached, executing travel guidance for that turning point with at least a voice generated by the voice generating device. When the turning point for which guidance is to be provided is included in a traffic circle and the route turns from the traffic circle to an exit road toward an outer side thereof at the turning point, the guiding device carries out travel guidance specifying how many ahead the exit road on the route is among such outer side exit roads.

For the guiding device in the above-described route guidance apparatus, it is the same as described above that, if the turning point for which guidance is to be provided is included in a traffic circle and the route turns from the traffic circle to an exit road toward an inner side thereof, the guiding device may carry out travel guidance specifying how many ahead the exit road on the route is among the inner side exit roads.

Also, it is the same as described above that, to distinguish between an outer side exit road and an inner side exit road, the route data storing device may store a turn angle of an exit road with the traffic direction on a circular route constituting the traffic circle as a reference for the outer side exit road or inner side exit road. Further, the guiding device may specify either one of an outer side exit road and an inner side exit road on the basis of that turn angle.

Also, the guiding device may provide travel guidance to as to the distance to the traffic circle and which number of exit road to exit to after entering the traffic circle at a predetermined distance before entering the traffic circle. Further, the guiding device may give travel guidance as to which number of exit road to exit to again immediately before entering the traffic circle. That is, for an ordinary turning point, travel guidance is provided every time a turning point is approached with that turning point as a reference. Therefore, for example when travel guidance is provided if the vehicle has reached, for example, 200 m before a turning point in the traffic circle, the vehicle may already have entered the traffic circle because the traffic circle itself is sometimes large. Therefore, if travel guidance as to the distance to the traffic circle and what number of exit road to exit on after entering the traffic circle is provided first at a predetermined distance (for example 200 m) before entering the traffic circle, and immediately before entering the traffic circle travel guidance as to what number of exit road to exit on is provided, it becomes travel guidance kind to the driver.

Also, although it has been indicated that it is sufficient if the guiding device is capable of providing at least travel guidance with a voice generated by the voice generating device, it may be made to execute the travel guidance not only with a voice generated by the voice generating device but also by image display in a display device for displaying characters and figures on its screen. Considering present navigation systems and the like, because it is usual for travel guidance to be provided appealing to sight and hearing by a voice output being made together with a screen display, it is also desirable for this to be done.

As a merit of travel guidance being carried out by a voice generated by the voice generating device, because it is not necessary for the driver to shift his visual point to the display device, the point that safe driving is better ensured can be given as an example.

To achieve the above-mentioned second object, a route guidance apparatus according to a second aspect of the present invention comprises a route data storing device for storing guide route data connecting a departure point to a destination, set with reference to prestored map data, and a route guiding device for, during travel of a vehicle, extracting a map and a guide route in the vicinity of the present position of the vehicle from the map data and the stored guide route data, displaying on a screen a map image including a map and a guide route of the present position' vicinity and a vehicle present position mark, and carrying out predetermined route guidance from the departure point to the destination. Also, the route guidance apparatus has an enlarged map displaying device for enlarging a map image including the map and the guide route of the present position's vicinity at least in the vicinity of a turning point and displaying the enlarged map image on the screen when a turning point for which guidance is to be provided existing on the guide route is approached. When the turning point for which guidance is to be provided belongs to a predetermined complex intersection area, the enlarged map displaying device adjusts the degree of enlargement of the map image so that the whole of that complex intersection area lies in a display region of the screen and is displayed at above a predetermined size. This "above a predetermined size" has a meaning like for example the maximum straight line distance of the complex intersection area being more than ½ of the minimum display width of the screen display region, of course, it may be larger or smaller than ½, but unless there is certain amount of size there ceases to be meaning in enlarging the map image. Therefore, it is preferable for the maximum straight line distance to be above about ½ of the shorter display width.

As the complex intersection area, for example a traffic circle is conceivable. A traffic circle is made up of a plurality of entrance roads and a plurality of exit roads connected to a closed circular route as described above (see FIGS. 14A, 14C), and the maximum diameter of that circular route is various. For example, the traffic circle shown in FIG. 14C is one whose circular route part is relatively large. When this is displayed enlarged on a fixed scale, only a part of the traffic circle is sometimes displayed, as shown in FIG. 14D. This is because, since a connection part between the circular route of the traffic circle and the exit road is taken as an intersection, only the vicinities thereof are displayed. However, when the vehicle travels on the traffic circle, after entering the circular route, it is necessary to travel while the driver recognizes how many ahead the exit road at which a turn should be made is. That is, unless not only the exit road alone but also the relative positional relationships in the entire traffic circle are understood, there is a possibility that the driver can not distinguish which exit road to exit on.

In contrast to this, according to the route guidance apparatus of the present invention, when a turning point for which guidance is to be provided belongs to the traffic circle, an enlarged map image with not the viewpoint "display the vicinity of the guidance turning point" but rather the viewpoint "display at a suitable size the entire traffic circle in which the guidance turning point is included" can be displayed. Consequently, the user seeing the enlarged map image can understand the relative positional relationships of the exit roads in the entire traffic circle and can travel recognizing how many ahead after entering the circular route the exit road at which a turn should be made is.

Also, as the complex intersection area, a loop-shaped connecting road is also conceivable. As described above, a loop-shaped connecting road is a road through which a vehicle proceeds from a ground road to an elevated road and which has a loop shape which connects them together. The size of that loop shape is various. For example, the loop-shaped connecting road shown in FIG. 17A is one whose loop-shaped part is relatively large. When this loop-shaped connecting road is displayed enlarged on a fixed scale, sometimes only a part of the loop shape is displayed as shown in FIG. 17B. When the entrance part to the loop-shaped connecting road is only displayed as a diagonal branch as shown in FIG. 17B, there is a possibility that a driver wanting to proceed to a route connected to the elevated road can not judge whether or not the diagonal branch being displayed is really a loop-shaped connecting road. In the end, the driver may not understand which branch to turn at.

In contrast to this, according to the route guidance apparatus of the present invention, when a guidance turning point belongs to a loop-shaped connecting road, an enlarged map image with not the viewpoint "display the vicinity of the guidance turning point" but rather the viewpoint "display at a suitable size the entire loop-shaped connecting road in which the guidance turning point is included" can be displayed. Consequently, the user seeing the enlarged map image can confirm that the loop-shaped connecting road displayed is the one connecting to the elevated road to which he wants to proceed, and can judge with confidence that he should turn at the diagonal branch displayed.

In this way, it is possible for the enlarged turning point (intersection) view displayed on the screen to be automatically changed to a scale suited to the actual route guidance.

From the point of view of displaying an entire traffic circle or an entire loop-shaped connecting road at a suitable size, it is preferable for the center of the traffic circle constituting the complex intersection area to be made the display center of the screen.

Also, as the complex intersection area, not only traffic circles but also complicated intersections can be given as an example. For example, when a road of a small width and a road of a large width make a "diagonal T intersection" or a "diagonal crossing intersection" and also roads of large widths including such intersections make a "diagonal crossroads intersection", it is a situation such that a plurality of roads intersect complicatedly within a region of about 100 m in radius. In this case, since there are a plurality of intersections and they are intersecting diagonally and so on, even if the color of the guide route and the color of the ordinary roads are made different and an intersection at which route guidance is to be provided is displayed enlarged, when the vehicle actually travels through the vicinity of that intersection, it is difficult for the user to make out the exact road to be travelled. That is, there is a possibility of it becoming impossible to distinguish which of the roads intersecting complicatedly within the above-mentioned region of about 100 m in radius the guide route is indicating.

Accordingly, in this case also, with a predetermined area that can be taken as such a complicated intersection area as a unit, it is possible to display an enlarged map image with the viewpoint "display at a suitable size the entire complex intersection area". Consequently, the user seeing that enlarged map image can easily grasp an exit road or the like on a set guide route even in that complicatedly intersecting road situation. In this case also, it is preferable for the center of the complex intersection area to be made the display center of the screen.

When a map image of a guidance turning point's vicinity is enlarged and displayed on a screen in this way, it is conceivable that a plurality of map data expressing a predetermined area on severally different scales is stored and the map of the largest scale among those for the enlarged map image of the turning point's vicinity is used. In this kind of situation, when the guidance turning point belongs to a predetermined complex intersection area, the map image displayed using the map data of the largest scale may be further enlarged or reduced so that the entire complex intersection area lies in the display region of the screen and is displayed at above a predetermined size.

Also, supposing that the complex intersection area is a traffic circle, it is preferable for the following to be done. That is, a traffic circle attribute is set for nodes and links constituting traffic circles. If a node indicating a guidance turning point has the traffic circle attribute it is determined that the guidance turning point belongs to a traffic circle. Also, with a link including the node indicating the guidance turning point and having the traffic circle attribute as a starting point, links having the traffic circle attribute are successively searched for until the searched links make a circular route. The shape and so on of the traffic circle are ascertained with links making the circular route obtained by searching.

Also, supposing that the complex intersection area is a loop-shaped connecting road, it is preferable for the following to be done. That is, a loop-shaped connecting road attribute is set for nodes and links constituting loop-shaped connecting roads. If a node indicating a turning point for which guidance is to be provided has the loop-shaped connecting road attribute, it is determined that the guidance turning point belongs to a loop-shaped connecting road. Also, with a link including the node indicating the guidance turning point and having the loop-shaped connecting road attribute as a starting point, links having the loop-shaped connecting road attribute are successively searched for until a termination of the loop-shaped connecting road. The shape and so on of the loop-shaped connecting road are ascertained with links from the starting point to the termination obtained by searching.

As a result, it is not necessary to separately store data showing areas in which a traffic circle or a loop-shaped connecting road exists or shape data of traffic circles or loop-shaped connecting roads in the map data. This is because a traffic circle or a loop-shaped connecting road can be generated from node data and link data when it is needed. Therefore, the structure as described above is advantageous also in the point of not increasing the volume of the map data.

When a displaying device screen-displays a complex intersection area at a suitable size, for example making the maximum distance of that complex intersection area about ½ of the display region width is conceivable. When the complex intersection area is a traffic circle or a loop-shaped connecting road, on the basis of the maximum straight line distance of the traffic circle or loop-shaped connecting road and the size of the screen display region, the map image is screen-displayed enlarged so that the traffic circle or loop-shaped connecting road lies in the screen display region and is displayed at above a predetermined size.

The maximum straight line distance of a traffic circle is its maximum diameter. The reason that the maximum diameter is used is that, for example in the case of an elliptical shape, the major axis thereof must be kept in the screen display region. In that sense, when the screen display region is rectangular it is necessary for the shorter display width to be used. On the other hand, the maximum straight line distance in the case of a loop-shaped connecting road is the distance between the two points most apart in the shape of the whole.

The traffic circle shown in FIG. 14A is one whose circular route part is relatively small. It has been mentioned above that when this is displayed enlarged on a fixed scale, there are times when as shown in FIG. 14B a line collapses and it becomes impossible to distinguish the details of the traffic circle depending on the link width drawn. The same situation can be imagined in a loop-shaped connecting road also.

To handle this kind of situation, in a case wherein the complex intersection area is a traffic circle or a loop-shaped connecting road and the map image is enlarged and screen-displayed with an ordinary line width, if the inner side of the traffic circle or loop-shaped connecting road collapses, the line width used at the time of the displaying should be reduced. However, when screen display is carried out with a reduced line width, if the image drawn with the reduced line width becomes invisible, it is preferably screen-displayed with a preset visible minimum line width.

Also, concerning the display position of the complex intersection area, carrying out screen display so that the entrance route to the complex intersection area is positioned in the vicinity of the lower end of the display region is conceivable. As a result, the guide route is displayed from the entrance route near the lower end of the display region toward the center of the display region, and agrees with the senses of the user when the travel direction of the vehicle is made a reference.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PREFERRED EMBODIMENTS (First EMBODIMENT)

Figure 1:
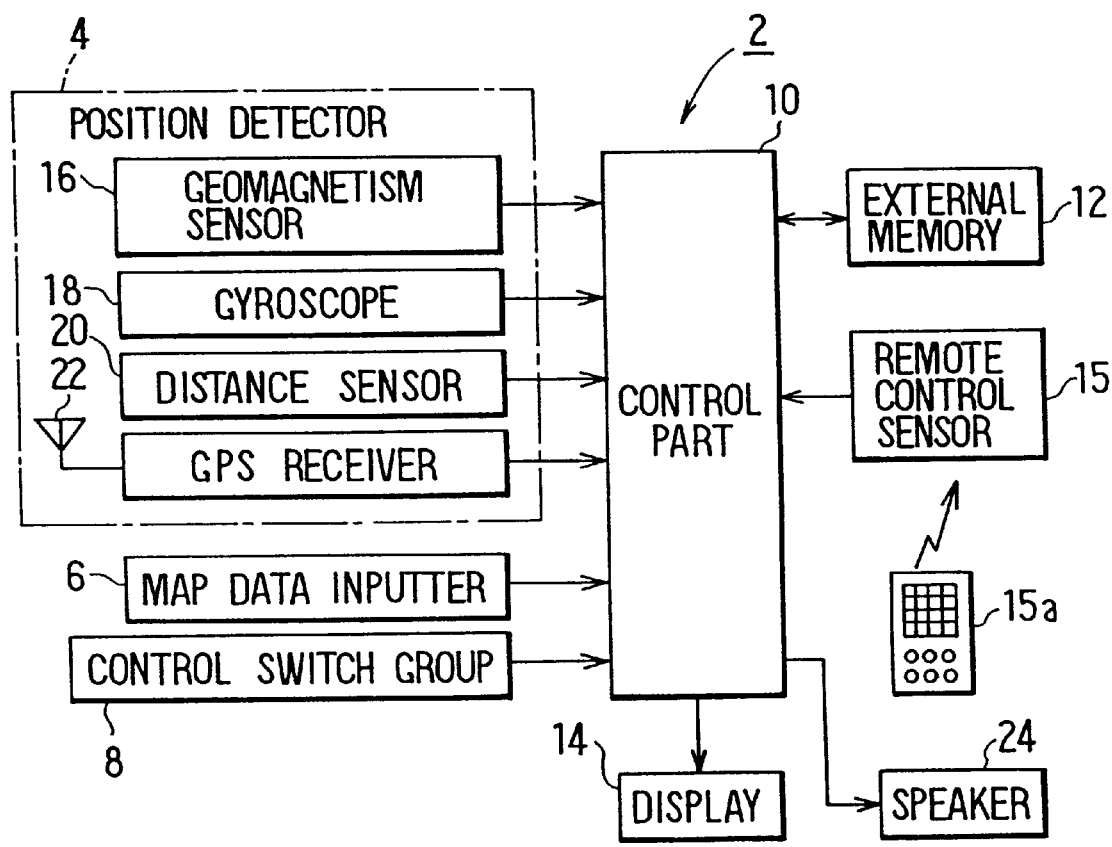
FIG. 1 is a block diagram showing the overall construction of a route guidance apparatus for mounting in a vehicle according to a first embodiment.

In FIG. 1, this route guidance apparatus 2 for mounting in a vehicle comprises a position detector 4, a map data inputter 6, a control switch group 8, an external memory 12, a display 14, a remote control sensor 15, a speaker 24 and a control part 10 connected to these. The control part 10 is constituted as an ordinary computer, and inside it are provided a CPU, ROM, RAM, I/O and a bus line connecting these together.

The position detector 4 has a geomagnetism sensor 16, a gyroscope 18, a distance sensor 20, and a GPS receiver 22 for the GPS (Global Positioning System) which detects the present position of the vehicle on the basis of radio waves from satellites, all of which are known.

These devices 16, 18, 20 and 22 all have errors of different natures. Therefore, by means of a plurality of sensor devices, it is constructed to use them while interpolating between them. Depending on the accuracy, the position detector 4 may be constituted with a part of those described above. Also, a steering rotation sensor, or wheel speed sensors on driven wheels or the like may be used.

The map data inputter 6 is a device for inputting to the control part 10 data including data for so-called map matching for increasing the accuracy of the position detection, map data and landmark (facility) data. As a recording medium in the map data inputter 6, because the amount of data is large, a CD-ROM is normally used. But, for example another medium such as a DVD or a memory card may alternatively be used.

The map data constitutes maps by connecting together multiple nodes such as intersections with links. With respect to each of the links is stored link information made up of a unique number specifying the link (the link ID), a link length showing the length of the link, X•Y coordinates of a starting end and a finishing end of the link, and a road width and data of road attributes of the link. These road attributes are set with the purpose of for example distinguishing toll roads with respect to ordinary roads, and also an attribute for specifying the traffic circle is set. Also, facilities, names of places, landmarks and the like displayed on the map are stored in map data. The makeup of this map data using link information is the same as that in prior art.

The position detector 4, the map data inputter 6, the control switch group 8, the control part 10, the display 14 and the remote control sensor 15 and so on constitute a so-called navigation apparatus. A present vehicle position mark, which will be further discussed later, inputted from the position detector 4, map data inputted from the map data inputter 6, and also additional data such as guide routes, names, and landmarks to be displayed on the map also can be displayed superposed on the screen of the display 14.

This route guidance apparatus 2 for mounting in the vehicle also has a so-called route guidance function of, when the position of a destination, and necessary designation of a specified route such as expressways (or, designation of points through which the vehicle is to pass) and the like are inputted by way of the remote control sensor 15 from a remote control terminal (hereinafter abbreviated to remote controller) 15*a*, or by means of the control switch group 8, automatically selecting an optimal route from the present position to that destination and displaying the guide route. As for the method for automatically setting an optimal route like this, methods such as the Dikstra method are known. For the control switch group 8, for example touch switches integral with the display 14 or mechanical switches or the like are adopted, and they are used for various inputs.

Processing executed by the above-mentioned control part 10 will now be described with reference to the flow charts of FIG. 2 to FIG. 4. Here, guidance route setting processing and route guidance processing by voice at turning points will be shown.

Figure 2:
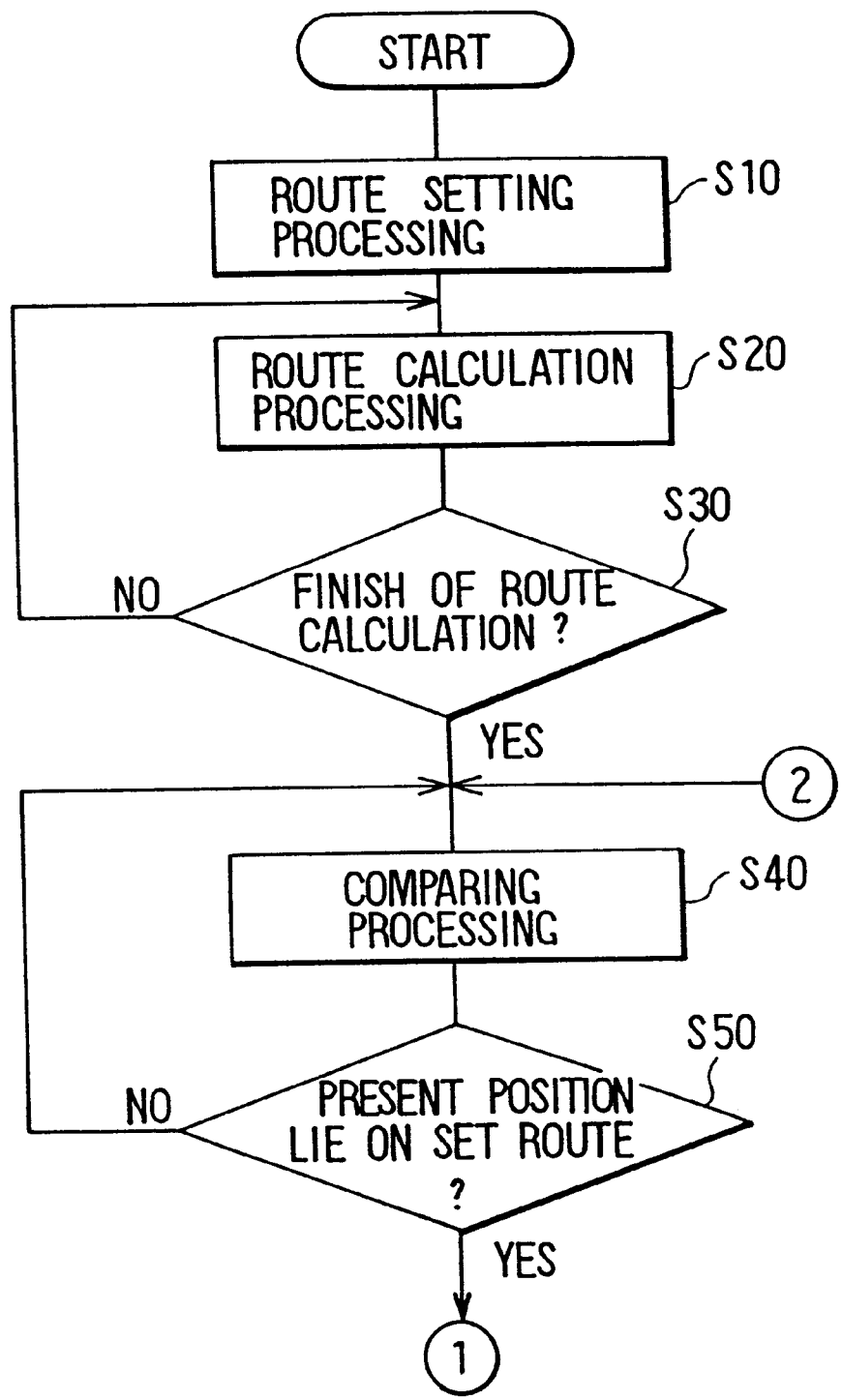
FIG. 2 is a flow chart showing processing executed in a control part of the first embodiment.

When a power supply switch of the route guidance apparatus 2 for mounting in the vehicle is turned on, after predetermined initialization, the processing of FIG. 2 starts.

First, route setting processing (S10) is carried out. This processing sets a destination and points through which the vehicle is to pass in accordance with instructions of a user. For example when a user sets a destination and points through which the vehicle is to pass on a map displayed on the display 14, this is carried out in the following way. Normally to carry out present position display processing, first the present position of the vehicle is calculated on the basis of a signal from the position detector 4 and a map in the vicinity of the present position is read from a CD-ROM set in the map data inputter 6 and displayed on the display 14. Then, when the user has carried out a destination setting operation, a map in the vicinity of the destination that the user selects by an operation of the control switch group 8 is displayed. In this state, acquisition of correct destination position data in accordance with the operation of the user and as necessary designation of a specified route are carried out.

When the route setting processing in this S10 ends and a route calculation starting operation is performed by the user, calculation of a route between the destination set by the user's operation and the present position, that is, route calculation processing is executed. In this route calculation processing, the route is calculated such that the route cost from the present position to the destination by way of points through which the vehicle is to pass becomes a minimum using link information and so on in the map data for example by the Dikstra method (S20). In correspondence with the route obtained by this route calculation processing, node IDs expressing the positions of turning points and link IDs expressing roads linking the positions of those turning points are extracted from the map data in the CD-ROM set in the map data inputter 6 and held in a working memory (not shown) inside the control part 10.

Accordingly, in S30 it is determined whether or not the route calculation processing has finished with respect to all the route and the node IDs and the link IDs in the route obtained by that route calculation processing has all been held in the working memory, i.e. whether or not subsequent route guidance processing is possible.

When the route calculation processing has finished (S30: YES), guidance data based on the route calculated in S20. and the present position are compared (S40). Then, it is determined whether or not the present position lies on the set route(S50). When the present position lies on the route (S50: YES), processing proceeds to S60 and determines whether or not the present position has reached the destination. When the destination has already been reached (S60: YES), the present processing is ended. But, when the destination has still not been reached (S60: NO), in S70 it is determined whether or not the next guidance intersection is within a traffic circle. This guidance intersection means an intersection, among intersections extracted as node IDs in step S20 (hereinafter called route object intersections), at which the route turns. Whether the next guidance intersection is an intersection in a traffic circle can be determined by referring to a node ID, because an ID showing a traffic circle is set in the map data in correspondence with the node ID of the intersection in the traffic circle.

When the guidance intersection is within a traffic circle (S70: YES), processing proceeds to S80. After traffic circle exit count and announcement position calculation processing are executed, processing proceeds to S90. When on the other hand it is not within a traffic circle (S70: NO), processing proceeds to S90 without executing the processing of S80. The processing content in S80 will be further discussed later with reference to FIG. 4; now the explanation of the flow chart of FIG. 3 will be continued.

In S90, the distance from the present position to the next guidance intersection is calculated. Then, it is determined whether or not that calculated distance to the guidance intersection and a preset announcement position are the same (S92). If the distance to the guidance intersection and the announcement position are the same (S92: YES), voice announcement processing is executed (S94), and after that processing proceeds to S40. When on the other hand the distance to the guidance intersection and the announcement position are not the same (S92: NO), processing proceeds to S40 is without executing the processing of S94.

Next, processing executed in the above-mentioned S80 will now be described on the basis of the flow chart of FIG. 4.

Figures 5, 6:
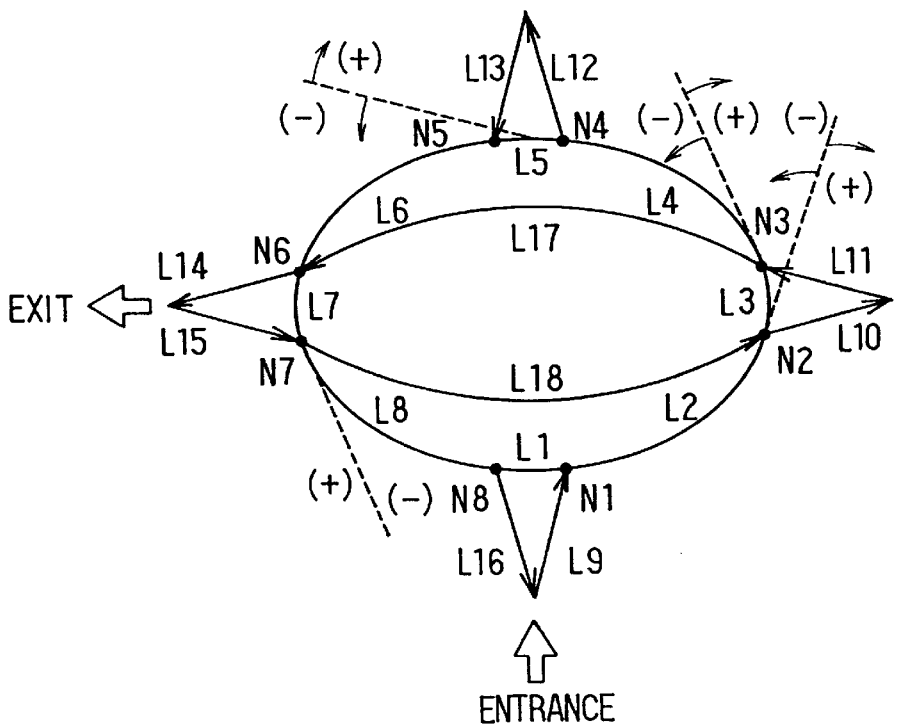
FIG. 5 is an explanatory view of route data set in relation to a traffic circle.
FIG. 6 is a table of turning point determination data set in relation to a traffic circle.
Figure 7A:
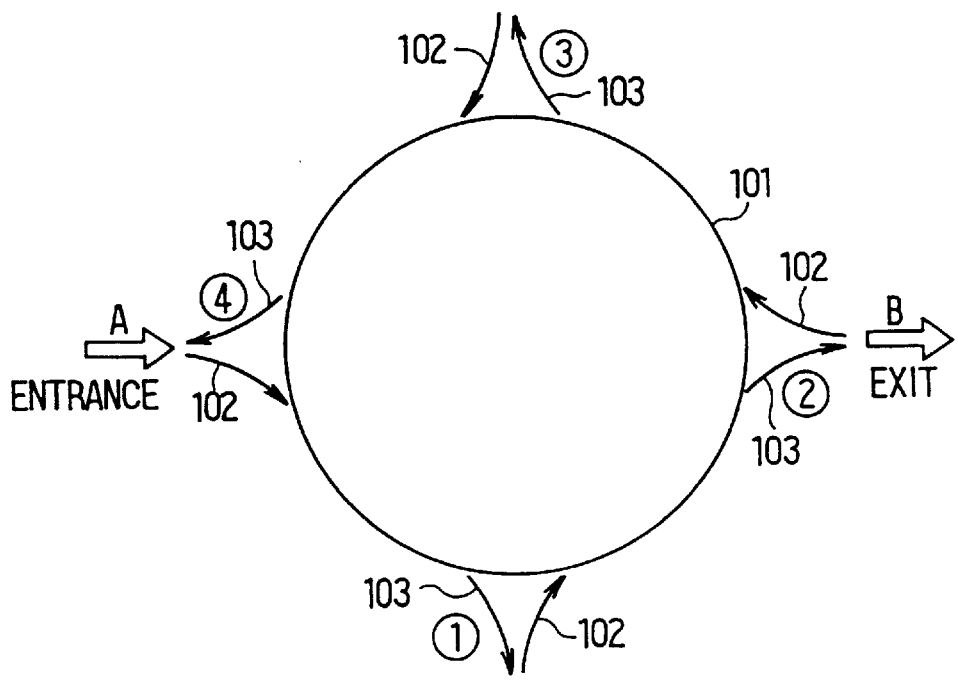
FIGS. 7A and 7B are explanatory views showing outlines of traffic circles.
Figure 7B:
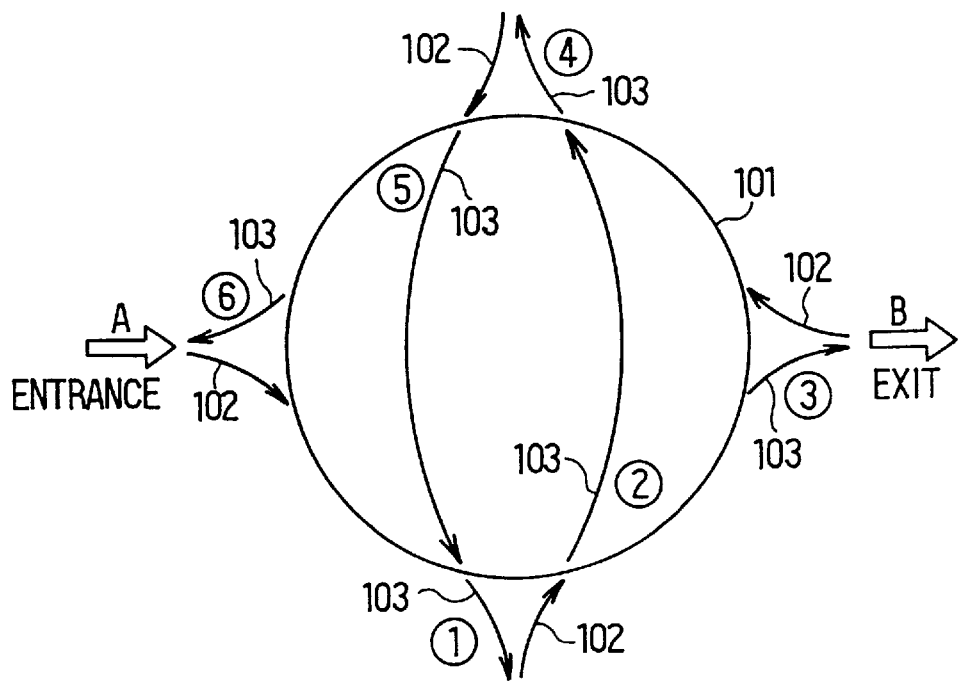

To explain the content of this processing more clear, the description will be provided with a traffic circle of the kind shown in FIG. 5 as a premise. First, data set in connection with this traffic circle will be described. In this traffic circle, the circular route is made up of links L1 through L8, and links L9 through L18 constituting entrance and exit roads to inside and outside the traffic circle are set with respect to nodes N1 through N8 constituting terminal nodes of the links L1 through L8. The traffic direction of the circular route made up by the links L1 through L8 is predetermined. For example, when L1 is taken as a starting point, the traffic direction is the one-way traffic of L1→L2→L3→L4→L5→L6→L7→L8.

Here, it will be described in detail which nodes the links L9 through L18 constituting the entrance and exit roads to inside and outside the traffic circle are connected to.

First, an entrance link L9 from the outer side of the traffic circle is connected to the node N1.

Also, an exit link L10 to the outer side of the traffic circle and an entrance link L18 from the inner side of the traffic circle are connected to the node N2. An entrance link L11 from the outer side of the traffic circle and an exit link L17 to the inner side of the traffic circle are connected to the node N3.

An exit link L12 to the outer side of the traffic circle is connected to the node N4. An entrance link L13 from the outer side of the traffic circle is connected to the node N5. An exit link L14 to the outer side of the traffic circle and an entrance link L17 from the inner side of the traffic circle are connected to the node N6. An entrance link L15 from the outer side of the traffic circle and an exit link L18 to the inner side of the traffic circle are connected to the node N7. And, an exit link L16 to the outer side of the traffic circle is connected to the node N8.

The traffic circle is made up of these kinds of links and nodes. To provide turn guidance on a route, turning point determination data as shown in FIG. 6 is also set. In the turning point determination data of FIG. 6, connected circle attribute links, connected exitable links, turn angles of the exitable links with respect to the circle attribute links, and turning point determination data are set for each of the eight nodes N1 through N8 on the traffic circle.

The connected circle attribute links show which of the eight links L1 through L8 constituting the traffic circle are connected to each of the nodes N1 through N8. For example, in the case of the node N1, because the links L1 and L2 are connected thereto, the connected circle attribute links are the links L1 and L2. Also, because the traffic direction of the circular route made up of the links L1 through L8 are the one-way traffic of L1→L2→L3→L4→L5→L6→L7→L8, to the node N1 the link L1 is an entrance road and the link L2 is an exit road. This is also the same for the node N2 and the others.

The connected exitable links show the exit links exiting to either inside or outside the traffic circle. In terms of the traffic circle example shown in FIG. 5, these are the six exitable links that are the link L10 connected to the node N2, the link L17 connected to the node N3, the link L12 connected to the node N4, the link L14 connected to the node N6, the link L18 connected to the node N7 and the L16 connected to the node N8.

Next, the turn angles of the exitable links with respect to the circle attribute links will be explained. For example, for the node N2, the exitable link that is an exit road connected to the node N2 is the link L10 and the circle attribute link is the link L3. Therefore, the turn angle of the exitable link with respect to the circle attribute link in the node N2 is an angle that the link L10 makes with respect to the link L3. When the exitable link is toward the outer side of the traffic circle, it is shown with a sign of plus in FIGS. 5 and 6. When it is toward the inner side, it is shown with a sign of minus. Accordingly, in the case of the traffic circle example shown in FIG. 5, the turn angle of the link L10 connected to the node N2 is plus 60°, the turn angle of the link L17 connected to the node N3 is minus 50°, the turn angle of the link L12 connected to the node N4 is plus 70°, the turn angle of the link L14 connected to the node N6 is plus 60°, the turn angle of the link L18 connected to the node N7 is minus 50°, and the turn angle of the link L16 connected to the node N8 is plus 70°.

The above was a description of data set for the traffic circle shown in FIG. 5, and the flow chart of FIG. 4 will now be described.

Figure 4:
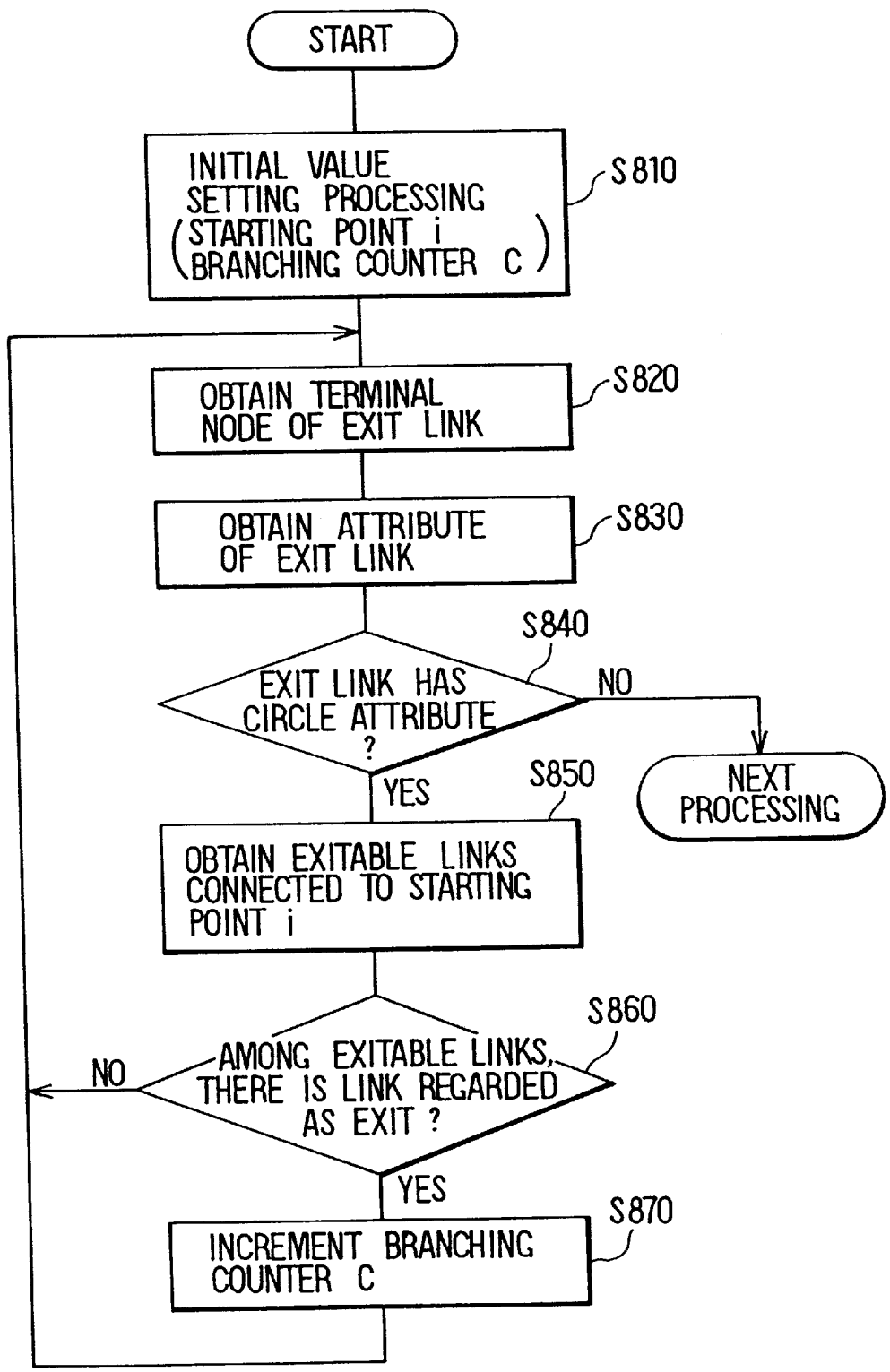
FIG. 4 is a flow chart showing processing executed in a control part of the first embodiment.

As the first processing of the flow chart of FIG. 4, setting of initial values is carried out (S810). In this processing, initial setting of a starting point i and a branching counter C is carried out. Here, a case in which a route entering from the link L9 and exiting to the link L14 in the traffic circle shown in FIG. 5 has been set will be supposed. Because the vehicle enters the traffic circle from the link L9, the starting point i becomes the node N1. Also, the initial value of the branching counter C is made 0.

When the initial value setting is finished, in the following S820, the starting point i is incremented to obtain the terminal node of an exit link of the node N1. Specifically, because the starting point i becomes the node N1 in S810, here the node N2 that is the terminal node of the exit link L2 having the node N1 as its starting point is obtained. Then, in S830, the attribute of the exit link on the set route having the terminal node N2 obtained in S820 as its starting point is obtained. As mentioned above, a case in which a route entering from the link L9 and exiting to the link L14 in the traffic circle has been set is being supposed. Therefore, if the route along the traffic circle is shown in link order, it is L9→L1→L2→L3→L4→L5→L6→L14. Consequently, the exit link on the set route having the terminal node N2 as its starting point is the link L3.

In the following S840, it is determined whether or not the exit link obtained in S830 has the circle attribute. If it does not have the circle attribute (S840: NO), the present processing ends. If it has the circle attribute (S840: YES), processing proceeds to S850. Because the exit link L3 having the node N2 as its starting point is of the circle attribute, processing proceeds to S850.

In S850, exitable links connected to the starting point i are obtained. Because in S820 the starting point i is incremented and thereby i=the node N2, exitable links connected to the node N2 are obtained. In this case, as exitable links from the node N2, there are the link L3 and the link L10.

Then, in the following S860, it is determined whether or not among the exitable links obtained in S850 there is a link that can be regarded as an exit. If there is such a link (S860: YES), processing returns to S820 after proceeding to S870 and incrementing the branching counter C. If there is no such a link (S860: NO), it returns directly to S820.

Here, it will be explained what the "among the exitable links, a link that can be regarded as an exit' is. First, links having the circle attribute are excluded from the link that can be regarded as an exit. Then, it is limited to links having a plus direction turn angle with respect to a link having the circle attribute. Therefore, among the links exiting to inside or outside the traffic circle, only links which exit to the outer side qualify. For example, although in S850 the link L3 and the link L10 are first identified as exitable links from the node N2, because the link L3 has the circle attribute, only the link L10 qualifies as "among the exitable links, a link that can be regarded as an exit". Therefore in this case in S870 the branching counter C is incremented (C=1) and processing returns to S820.

When processing returns to S820, the node N3 that is the terminal node of the exit link L3 of this time is obtained by incrementing the starting point i. In the following S830, the link L4 that is the exit link on the route from the node N3 is obtained. In this case also, because the link L4 has the circle attribute (S840: YES), processing proceeds to S850 and obtains the exitable links connected to the node N3. The exitable links in this case are the link L4 and the link L17. However, because the link L4 has the circle attribute and, referring to FIG. 6, the turn angle of the link L17 is minus 50°, neither qualifies as "among the exitable links, a link that can be regarded as an exit" (S860: NO). Therefore, processing returns to S820 without incrementing the branching counter C. That is, exit links exiting to the inside of the traffic circle are not counted by the branching counter C.

Then, when processing returns to S820, the node N4, which is the terminal node of the exit link L4 of this time, is obtained by incrementing the starting point i. In the following S830, the attribute of the link L5, which is the exit link on the route from the node N4, is obtained. In this case also, because the link L5 has the circle attribute (S840: YES), processing proceeds to S850 and obtains exitable links connected to the node N4. The exitable links in this case are the link L5 and the link L12. The link L5 has the circle attribute and does not qualify. However, because, referring to FIG. 6, the turn angle of the link L12 is plus 70°, the link L12 qualifies for "among the exitable links, a link that can be regarded as an exit" (S860: YES). Accordingly, in S870 the branching counter C is incremented (C=2) and processing returns to S820.

In S820 in this case, the node N5, which is the terminal node of the exit link L5, is obtained. In the following S830, the link L6, which is the exit link on the route from the node N5 is obtained. In this case also, because the exit link L6 has the circle attribute (S840: YES), processing proceeds to S850 and obtains the exitable links connected to the node N5. The only exitable link in this case is the link L6. Because the link L6 has the circle attribute, it does not qualify for "among the exitable links, a link that can be regarded as an exit" (S860: NO), and therefore processing returns directly to S820.

Then, when processing returns to S820, the node N6 that is the terminal node of the exit link L6 of this time is obtained. In the following S830, the link L14, which is the exit link on the route from the node N6, is obtained. Because the exit link L14 does not have the circle attribute (S840: NO), the present processing routine ends here.

Figure 3:
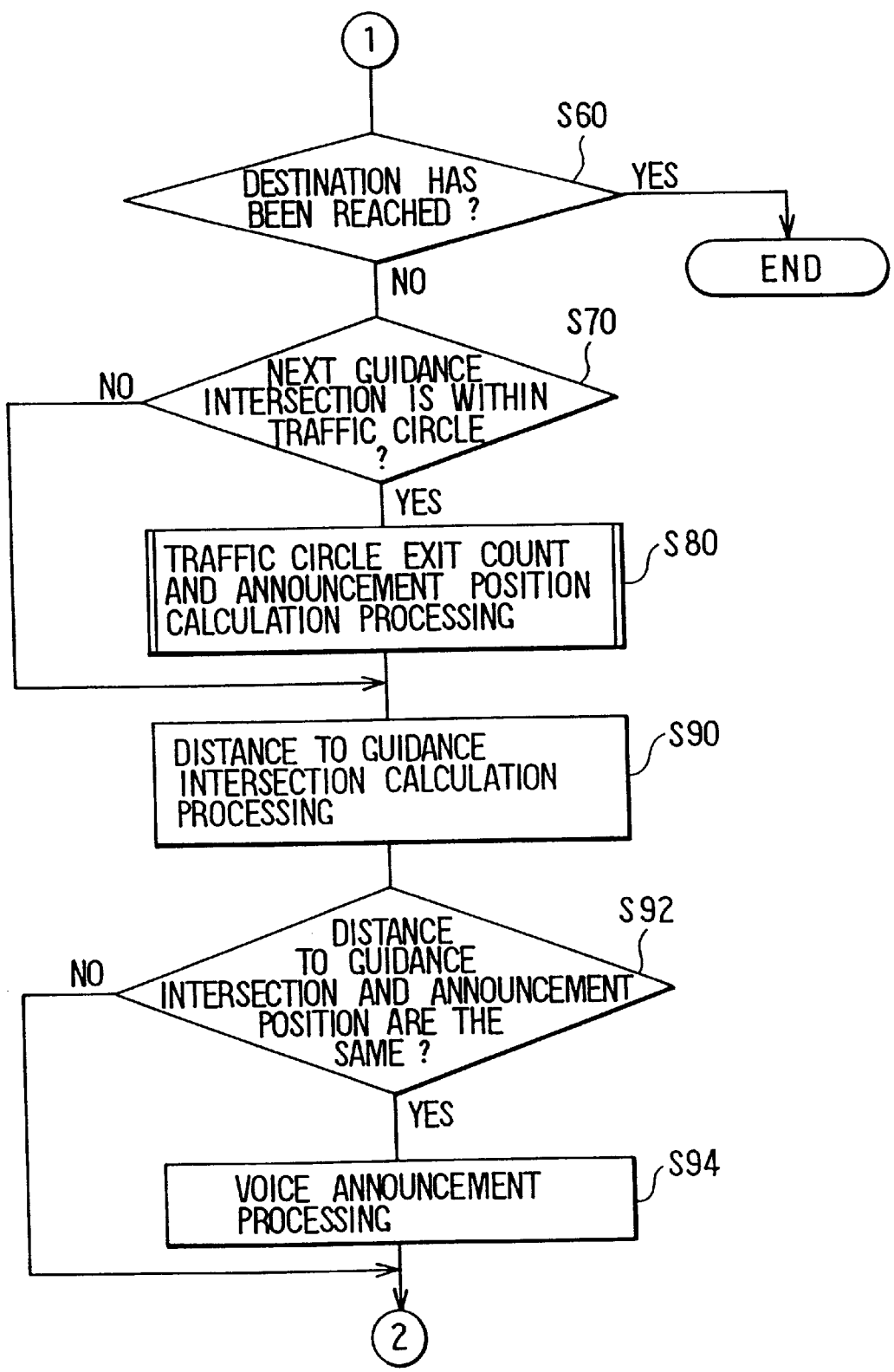
FIG. 3 is a flow chart showing processing executed in a control part of the first embodiment.

As a result, processing shifts to S90 of the flow chart of FIG. 3 with the branching counter C made C=2. When the vehicle reaches the predetermined announcement position (S92: YES) which is a position having a predetermined distance before the guidance intersection, predetermined voice announcement processing is executed (S94). In this case, because the branching counter C=2, the voice guidance is provided so that the driver exits onto the third exit after the vehicle enters the traffic circle. For example, it has guidance content such as "Please exit at the exit road three ahead.". That is, if the link L17 exiting from the node N3 to the inner side of the traffic circle is considered, the link L14 is the exit road four ahead. However, when only links exiting to the outer side of the traffic circle are counted, the link L14 is three ahead. As discussed above in the "Related Art", at this kind of traffic circle, because those in which exit roads are set only to the outer side are the vast majority, as the consciousness of the driver, often it is taken for granted that exit roads are roads exiting to the outer side. Therefore, by providing guidance like "Please exit at the exit road three ahead.", the link L14, which as an exit road to the outer side is three ahead, is understood as the exit road to be taken. By this means, guidance which matches the sense of the driver and with which it is possible for the driver to exit onto the appropriate exit road can be realized.

Also, in the embodiment described above, when the distance to the guidance intersection is the same as a predetermined announcement position (S92: YES), voice announcement processing is executed. This voice announcement, with respect to one guidance intersection, may be carried out once or a plurality of times. For example, travel guidance may be given at 200 m before entering a traffic circle as to the distance to the traffic circle and which number of exit road after entering the traffic circle to exit to, and then immediately before entering the traffic circle travel guidance may be given again as to which number of exit road to exit to. In addition, for example at 1 km before the traffic circle it may be announced only that there is a traffic circle 1 km ahead. In any case, because travel guidance different from that for an ordinary intersection is necessary for a traffic circle, it is preferable to inform the driver of its existence early.

In this embodiment, the speaker 24 is a voice generating device, the position detector 4 is a present position detecting device, the control switch group 8 is a destination setting device, and the map data inputter 6 and the CD-ROM set therein are a route data storing device. Also, the processing of the steps S70 through S94 of the flow chart of FIG. 3 is processing serving as a guiding device.

The present invention is in no way limited to the above-described embodiment, and can be embodied in various forms in a range not deviating from the gist of the invention.

For example, although in the embodiment described above a counterclockwise traffic circle was presupposed in the description, of course this may alternatively be a clockwise traffic circle. In that case, the IDs of the nodes and the links are set in that traffic direction order, and the directions of the connections of the entrance links and the exit links are also reversed. Counterclockwise traffic circles are thought to be preferable when vehicles travel on the right side and clockwise traffic circles to be preferable when vehicles travel on the left side.

Also, in the embodiment described above, travel guidance was provided by generating voice from a speaker 24, but it may also be executed by displaying characters and figures on the screen of the display 14. Considering present navigation systems, because it is usual for travel guidance to be provided appealing to sight and hearing of the driver by a voice output being made together with a screen display, it is desirable for this to be done. As a merit of travel guidance being carried out by a voice generated from the speaker 24, because it is not necessary for the driver to shift his visual point to the display 14, the point that safe driving is better ensured can be given as an example. Therefore, it is desirable for guidance with a voice to be made a base.

(Second Embodiment)

A second embodiment of the present invention will now be described referring to the drawings.

The overall construction of the second embodiment is ID the same as that of the first embodiment. Therefore, the description of the construction will be omitted here.

The map data stored in the map data inputter 6 constitutes maps by connecting together multiple nodes such as intersections with links. With respect to each of the links is stored link information made up of a unique number specifying the link (the link ID), a link length showing the length of the link, X•Y coordinates of a starting end and a finishing end of the link, and a road width and a road type (indicating road information such as that the road is a toll road) of the link. The construction of this map data using link information and so on is the same as the first embodiment. However, in the case of this second embodiment, for displaying maps having different scales on the display 14, a plurality of maps expressing predetermined areas on for example eight different scales are held in the recording medium of the map data inputter 6. A map of the largest scale among these (for example 1/4000) is used for intersection enlargement view.

However, in this embodiment, using the map of the largest scale of 1/4000, an enlarged view increased to a scale of 1/500 is displayed on the display 14. This enlarged view equivalent to the map of 1/500 scale can be displayed further enlarged or reduced to any magnification.

Figure 8:
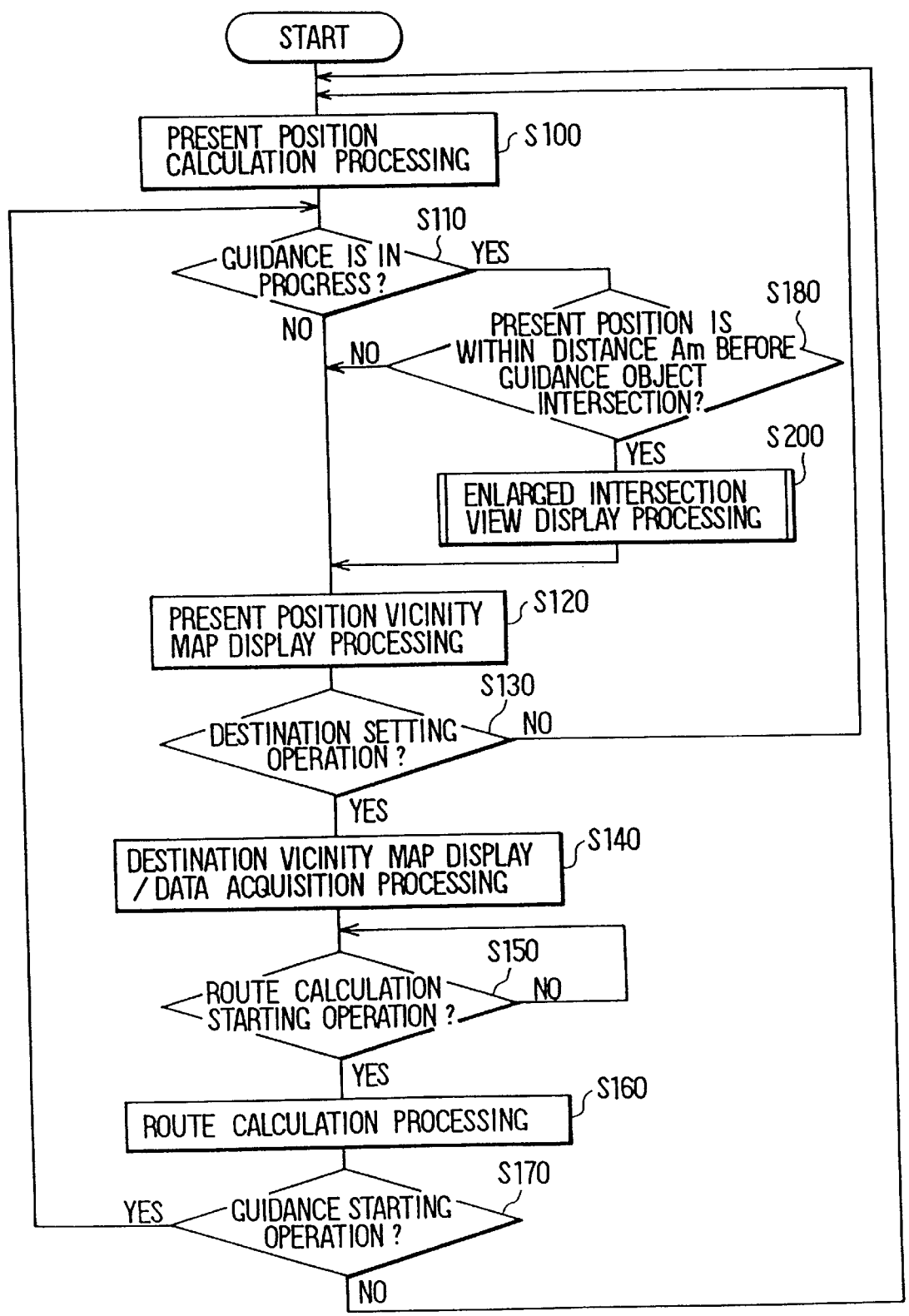
FIG. 8 is a flow chart showing processing executed in a control part according to a second embodiment.

In the second embodiment, processing executed by the control part 10 is shown in the flow chart of FIG. 8. Here, mainly guide route setting processing, present position's vicinity map display processing and enlarged intersection view display processing are shown.

When a power supply switch of the route guidance apparatus 2 for mounting in a vehicle is turned on, after predetermined initial setting, the processing of FIG. 8 starts.

First, present position calculation processing (S100) is carried out. Here, the present position of the vehicle is calculated from a signal from the position detector 4. Then it is determined whether or not route guidance is in progress (S110). That is, it is determined whether or not as a result of a setting operation of the driver it is now a mode (hereinafter, the guidance display mode) for displaying route guidance (here, intersection guidance) to a destination. If it is not the guidance display mode (S110: NO), present position's vicinity map display processing (S120) is carried out using map data of the respective area being read out from the CD-ROM set in the map data inputter 6.

Next, it is determined whether or not a destination setting operation has been carried out by the driver (S130). If the destination setting operation has not been carried out (S130: NO), processing returns to the present position calculation processing of step S100. Therefore, if route guidance is not in progress (S110: NO) and the destination setting operation has not been carried out (S130: NO), display (S120) of a map of the present position's vicinity corresponding to movement of the vehicle is repeated.

Next, when the driver has carried out the destination setting operation (S130: YES), a map in the vicinity of the destination that the driver inputs is displayed. Acquisition of data of the exact destination position and as necessary designation of a specified route are carried out in accordance with the operation of the driver (S140). Next, processing waits for a route calculation starting operation (S150). When a route calculation starting operation is carried out by the driver (S150: YES), calculation of a route between the set destination and the present position is carried out using link information and so on in the map data, for example by the Dikstra method. As a result, a route such that the route cost from the present position to the destination by way of points through which the vehicle is to pass becomes a minimum is calculated (S160). In correspondence with this calculated route, node IDs expressing the positions of intersections and link IDs expressing roads connecting the positions of those intersections are extracted from the map data in the CD-ROM set in the map data inputter 6 and held in a working memory inside the control part 10.

Next, it is determined whether or not a guidance starting operation is made by the driver (S170). When no guidance starting operation is made within a predetermined time (S170: NO), the routine returns directly to the processing of step S100 and repeats the processing of the above-mentioned steps S100, S110, S120 and S130.

When the guidance starting operation is made within the predetermined time (S170: YES), processing returns to step S110 and it is determined whether or not route guidance is in progress. Because the guidance starting operation has been carried out, it is determined "YES" in step S110. Therefore, processing proceeds to S180, and it is determined whether or not the present position of the vehicle is within a distance Am before a guidance object intersection. This guidance object intersection means an intersection, among the intersections extracted as node IDs in the above-mentioned step S160 (hereinafter called route object intersections), at which the route turns. The distance Am is a distance of, for example, about 200 m or 400 m. If the vehicle is not within the distance Am before the guidance object intersection (S180: NO), the processing advances to step S120 and continues processing for displaying a map of the present position's vicinity as usual.

When the vehicle comes within the distance Am before the guidance object intersection, enlarged intersection view display processing (S200) is executed. The details of this enlarged intersection view display processing of S200 will be described with reference to the flow chart of FIG. 9.

In this processing, the type of the next guidance intersection is obtained (S210). Then, it is determined whether or not the next guidance intersection is in a traffic circle (S220). An ID capable of discriminating an intersection in a traffic circle is set in the map data in association with the node ID corresponding the intersection within the traffic circle. Therefore, when the node ID is referred to, it is possible to determine whether or not the next guidance intersection is the intersection in the traffic circle. In the ID case of this embodiment, even if the next intersection is an intersection in a traffic circle, when the vehicle enters the traffic circle via the node corresponding thereto, that intersection does not qualify as an intersection in a traffic circle. Only when the vehicle exits from the traffic circle through a node, is it determined that the intersection corresponding to the node is a guidance intersection in a traffic circle.

When the guidance intersection is not the intersection in a traffic circle (S220: NO), processing proceeds to S290. In S290, the scale magnification of the enlarged intersection view is made 1×, and the guidance intersection itself that is the guidance object is made the display center. In the case of intersection enlargement, as mentioned above, using the map of the largest scale (for example 1/4000) among a plurality of maps expressing predetermined areas on eight scales, an enlarged view equivalent to a map of 1/500 scale is made. Then, this enlarged view equivalent to the map of 1/500 scale can be displayed further enlarged/reduced to any magnification. The scale magnification decides what magnification the enlarged view equivalent to the scale of 1/500 is brought to.

Accordingly, in S280, to which the processing moves after S290, a map including the guidance intersection as the display center is drawn at the scale magnification (1×) determined in S290.

When on the other hand the guidance intersection is an intersection in a traffic circle (S220: YES), processing proceeds to S230 and obtains node information having the attribute of the traffic circle in which the guidance intersection is included.

The details of node information acquisition processing in this S230 will now be described with reference to the flow chart of FIG. 10.

Figure 13:
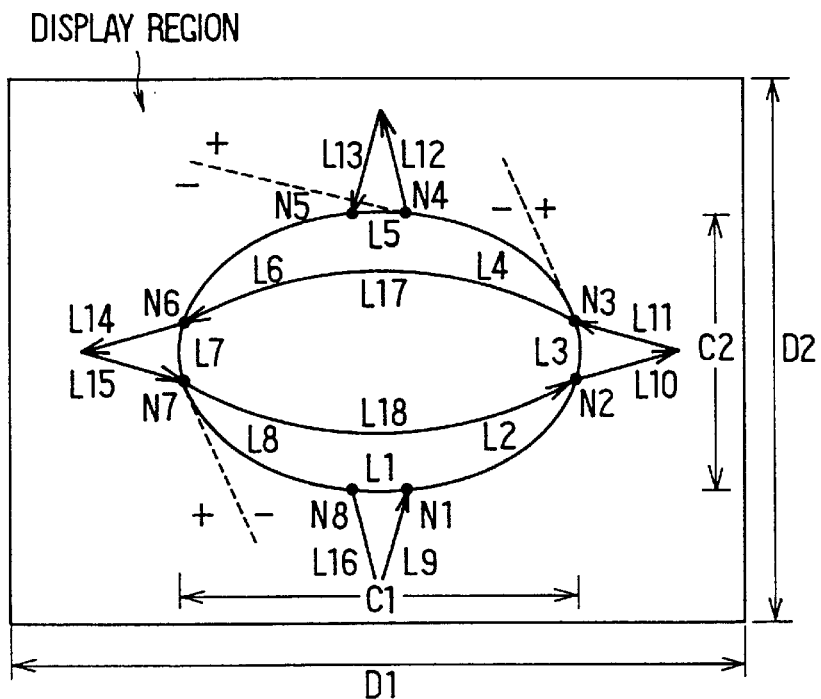
FIG. 13 is an explanatory view of route data set in relation to a traffic circle and the size of a traffic circle and the size of a display region.

To explain this processing content clearer, the description will be given supposing that the guidance intersection is an intersection included in a traffic circle shown in FIG. 13. First, the data set in relation to this traffic circle will be described. In this traffic circle, the circular route is made up of links L1 through L8, and links L9 through L18 constituting entrance and exit roads to inside and outside the traffic circle are set with respect to nodes N1 through N8 constituting terminal nodes of the links L1 through L8. The traffic direction of the circular route made up by the links L1 through L8 is regulated. For example when L1 is taken as a starting point, the traffic direction is the one-way traffic of L1→L2→L3→L4→L5→L6→L7→L8.

It will be described in detail which nodes the links L9 through L18 constituting the entrance and exit roads to inside and outside the traffic circle are connected to.

First, an entrance link L9 from the outer side of the traffic circle is connected to the node N1.

Also, an exit link L10 to the outer side of the traffic circle and an entrance link L18 from the inner side of ID the traffic circle are connected to the node N2. An entrance link L11 from the outer side of the traffic circle and an exit link L17 to the inner side of the traffic circle are connected to the node N3.

An exit link L12 to the outer side of the traffic circle is connected to the node N4. An entrance link L13 from the outer side of the traffic circle is connected to the node N5. An exit link L14 to the outer side of the traffic circle and an entrance link L17 from the inner side of the traffic circle are connected to the node N6. An entrance link L15 from the outer side of the traffic circle and an exit link L18 to the inner side of the traffic circle are connected to the node N7. Also, an exit link L16 to the outer side of the traffic circle is connected to the node N8.

The flow chart of FIG. 10 will now be explained. The processing in FIG. 10 is for obtaining node information constituting the traffic circle with the guidance intersection as a reference.

Figure 10:
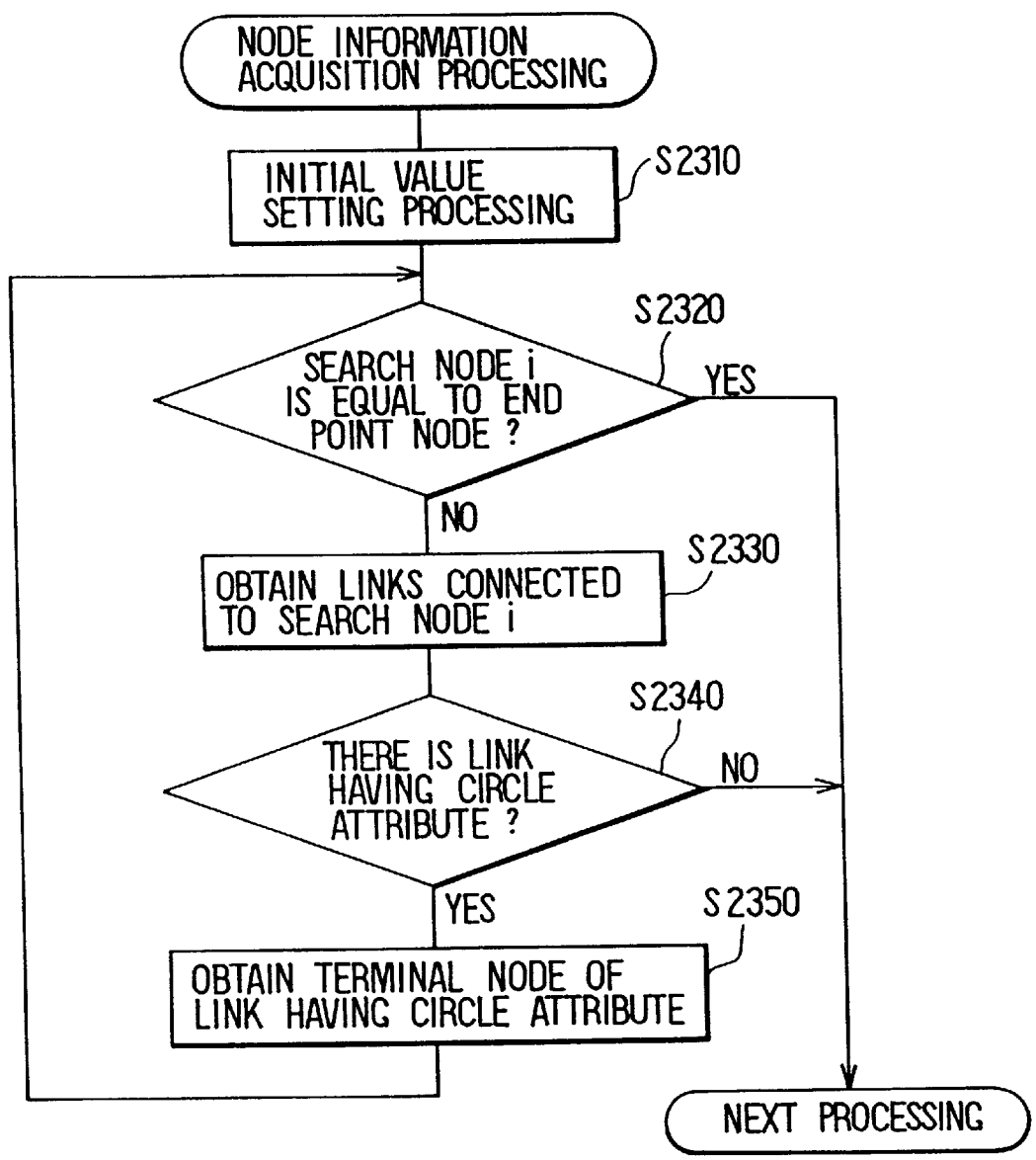
FIG. 10 is a flow chart showing node information acquisition processing of the second embodiment.

In an initial step S2310 of the flow chart of FIG. 10, an end point node and an initial value of a search node i are set. Hereinafter, the explanation will be given supposing a route exiting from the node N6 to pass through the link L14. The end point node in this case is the node N6, and the search node i is the node one before the end point node on the set route. The end point node (N6) and the initial value (N5) of the search node i are held in a memory region inside the control part 10.

Then, in the following S2320, it is determined whether the search node i is equal to the end point node. Because, when the search node i has the initial value (N5), the two nodes are not the same (S2320: NO), processing proceeds to S2330. In S2330, the links connected to the search node i are obtained. When the search node i=N5, as shown in FIG. 13 the connected links are the three links L5, L6, L13. However, in S2310, the node N5 connected to the end point node N6 on the set route by way of the link L6 has been made the initial value of the search node i. Because, as described above, the present routine is for obtaining node information constituting the traffic circle with the guidance intersection as a reference, here the link L6 can be removed from the candidates. Therefore, the links obtained in S2330 are, when the search node i=N5, the two links L5 and L13.

Then, in the following S2340, it is determined whether or not a link having the traffic circle attribute exists among the links obtained in S2330. Because IDs capable of discriminating links in a traffic circle are set in the map data as the link IDs in association with the links constituting the traffic circle, if these link IDs are referred to, it can be determined whether or not the link has the traffic circle attribute.

If no link having the circle attribute exists (S2340: NO), the present processing is ended. But, if a link having the circle attribute exists (S2340: YES), processing proceeds to S2350. When the search node i=N5, since the link L5 has the circle attribute, processing proceeds to S2350. In S2350, the terminal node of the link having the circle attribute is obtained. In the case of the link L5, the terminal node is N4. This terminal node N4 is held in the memory region inside the control part 10.

Then, processing returns to S2320 and this time the processing of S2320 through S2350 is executed making the search node i=N4. As a result, in S2350, as the terminal node the node N3 is obtained. In the same way, the processing of S2320 through S2350 is repeatedly executed. As a result, the nodes N2, N1, N8 and N7 are successively obtained as the terminal node. Then, because the link having the traffic circle attribute connected to the node N7 is the link L7 and the terminal node N6 thereof is the same as the end point node, in S2320 an affirmative determination is made. As a result, the present processing routine ends and processing shifts to S240 of FIG. 9.

Figure 9:
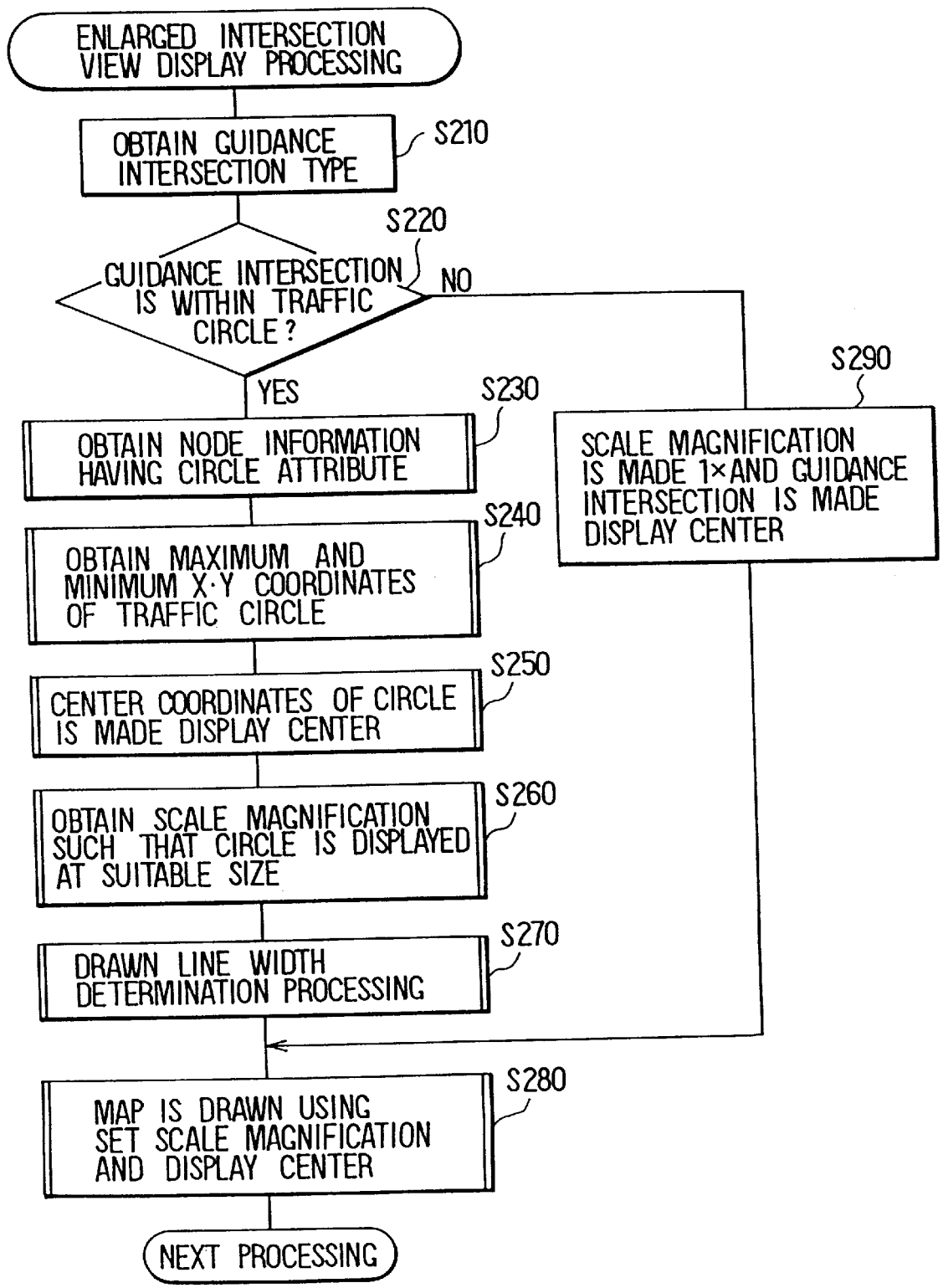
FIG. 9 is a flow chart showing enlarged intersection view display processing of the second embodiment.

In S240 of FIG. 9, using the circle attribute node information obtained in S230, the maximum value Xmax and the minimum value Xmin of the X-axis and the maximum value Ymax and the minimum value Ymin of the Y-axis in coordinate of the nodes constituting the traffic circle are obtained. Specifically, in the case of the traffic circle shown in FIG. 13, the coordinates $(X_n, Y_n)$ (n=1 to 8) in the map data of the eight nodes N1 through N8 constituting the traffic circle are compared. As a result, the respective maximum values and minimum values of the X-axis and the Y-axis are obtained.

In the following S250, using the maximum value Xmax and the minimum value xmin of the X-axis and the maximum value Ymax and the minimum value Ymin of the Y-axis obtained in S240, their center coordinates (Xc, Yc) are calculated with the following expressions.

$$Xc=(Xmax+Xmin)/2$$

$$Yc=(Ymax+Ymin)/2$$

These center coordinates (Xc, Yc) are then set as the display center of when the traffic circle is displayed.

In the following S260, processing to obtain a scale magnification such that the traffic circle will be displayed at a suitable size with respect to the display region of the display 14 is carried out. This scale magnification acquisition processing will be described in detail with reference to the flow chart of FIG. 11.

Figure 11:
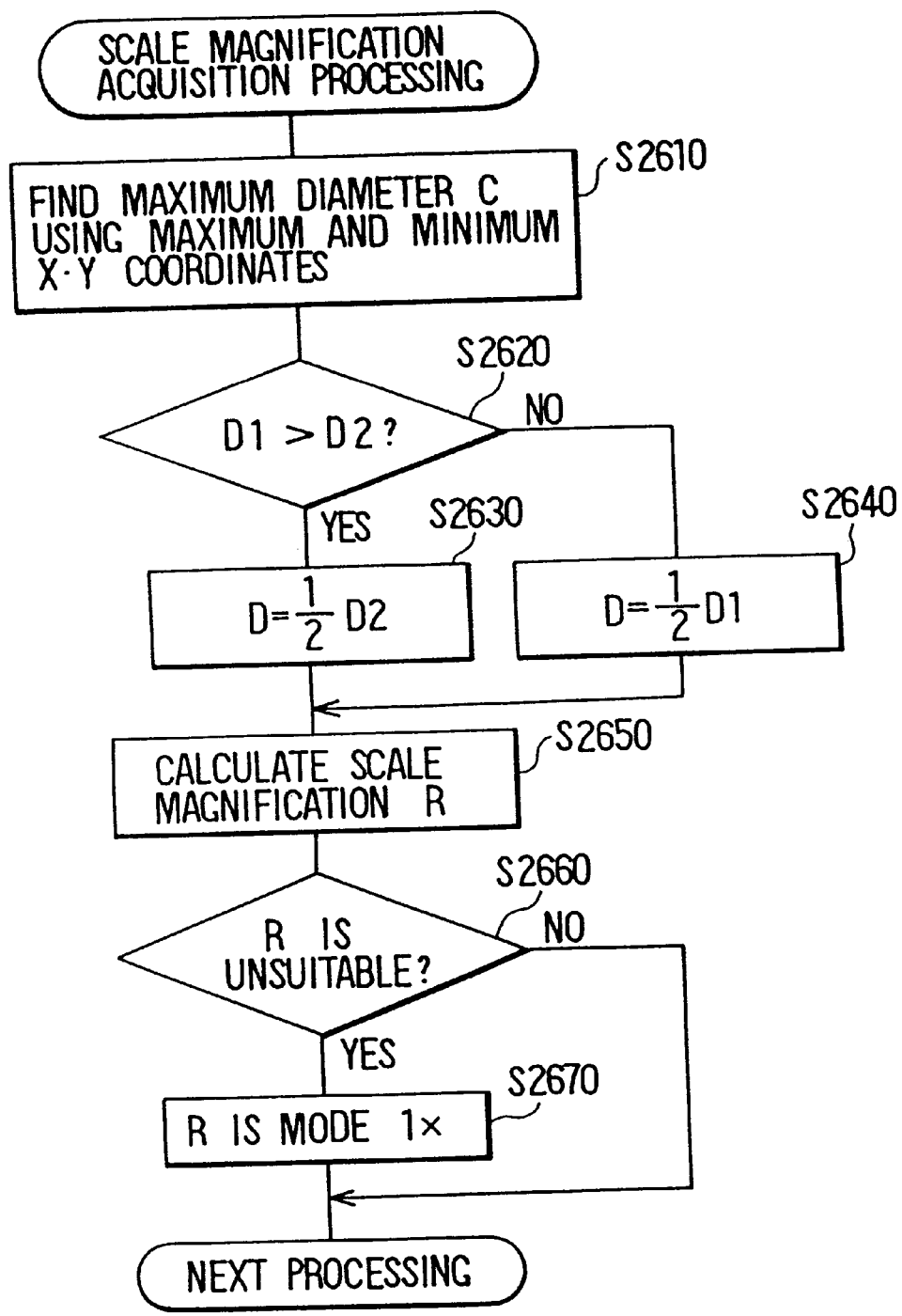
FIG. 11 is a flow chart showing scale magnification acquisition processing of the second embodiment.

In initial step S2610 of FIG. 11, a maximum diameter C is found using the maximum and minimum values of X, Y coordinates (Xmax, Xmin, Ymax, Ymin) of the traffic circle obtained in S240. Specifically, if in FIG. 13 the diameter of the X-axis direction is written C1 and the diameter of the Y-axis direction is written C2, because C1=Xmax−Xmin and C2=Ymax−Ymin, the larger of C1 and C2 is made the maximum diameter C. In the case of FIG. 13, because the X-axis direction diameter C1 is the larger, the maximum diameter C=C1.

In the following S2620, for the length D1 on the map that the horizontal direction display width of the display region of the display 14 shows and the length D2 on the map that the vertical direction display region thereof shows, it is determined whether or not D1>D2. As mentioned above, in the case of intersection enlargement, an enlarged map of 1/500 scale is used. Therefore, the lengths D1, D2 on the map shown by the horizontal and vertical direction display widths of the display region are the lengths on the 1/500 enlarged map.

Then, when D1>D2 (S2620: YES), processing proceeds to S2630 and makes a display width for scale magnification calculation D=(½)D2. That is, because D1>D2 means that the display has a horizontally long display region, the shorter vertical direction display width D2 is used as a reference. Further, to make the maximum diameter C of the traffic circle about ½ of the vertical direction display width D2, the vertical direction display width is multiplied by (½).

On the other hand, when D1 is not greater than D2, i.e. when D1≦D2 (S2620: NO), processing proceeds to S2640 and makes the display width for scale magnification calculation D=(½)D1. That is, because D1≦D2 means that the display has a vertically long display region or has the same length horizontally and vertically, the shorter (or the same length) horizontal direction display width D1 is used as a reference.

After a display width for scale magnification calculation D is obtained in S2630 or S2640, processing proceeds to S2650 and a scale magnification R is found with the following expression.

$$R=C/(D \times A)$$

A is a coefficient for increasing precision. When precision is not to be increased the coefficient A is made 1, and when precision is to be increased the coefficient is made a value larger than 1.

For example, we will make D2=1000 m and C=100 M and A=1 and calculate the scale magnification R. Because the display width for scale magnification calculation D is calculated by multiplying D2 by ½, D is 500 m. Therefore, R=100 m/500 m=⅕. If a turning point in a traffic circle (C=100 m) is treated as an ordinary intersection, the traffic circle would only be about 1/10 of the size of the vertical direction display width (1000 m) of the display region. However, the traffic circle is displayed with the map having the vertical direction display width multiplied by ⅕. That is, with the scale of the map multiplied by 5, it is possible to display the traffic circle (c=100 m) at a size of about ½ of the vertical direction display width (D2=200 m). In this case, for example the scale (1/500) of the map is multiplied by 5 and made a scale of 1/100, whereby the map is displayed in more detail.

Reversely, for example we will make D2=1000 m, C=2000 m and A=1 and calculate this scale magnification R. Because the display width for scale magnification calculation D is 500 m, R=2000 m/500 m=4. If the traffic circle (C=2000 m) is treated as an ordinary intersection, the traffic circle (C=2000 m) becomes twice the vertical direction display width (1000 m) of the display region and cannot be displayed in its entirety. However, if the vertical direction display width (1000 m) is quadrupled for display, that is, the scale of the map is multiplied by ¼ for display, it is possible to make the traffic circle a size of about ½ of the vertical direction display width. In this case, for example the scale of the 1/500 map is multiplied by ¼ and made a scale of 1/2000, thereby displaying a map of a wide area.

In the following S2660, it is determined whether or not the calculated scale magnification R is unsuitable. If it is unsuitable (S2660: YES), the scale magnification R is made 1×. After that, the present processing routine is ended and processing proceeds to S270 of FIG. 9. If on the other hand the scale magnification R obtained in S2650 is suitable, the present processing routine is ended directly and processing proceeds to S270.

In S270 of FIG. 9, the width of the drawn lines is decided. This drawn line width determination processing will be described in detail with reference to the flow chart of FIG. 12.

Figure 12:
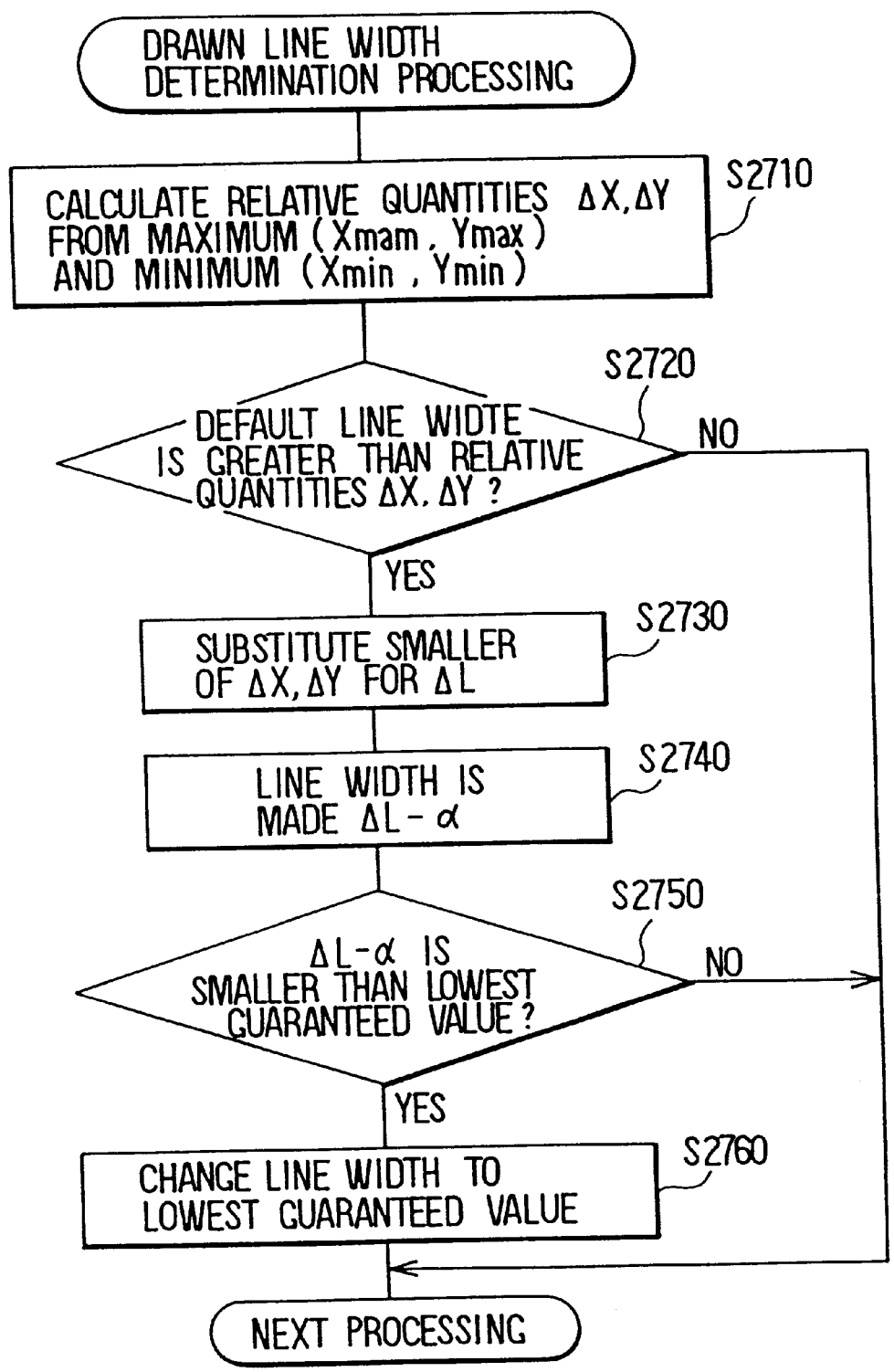
FIG. 12 is a flow chart showing drawn line width determination processing of the second embodiment.

In an initial step 2710 of FIG. 12, relative quantities $\Delta X$, $\Delta Y$ are found using the maximum and minimum X and Y coordinates (Xmax, Xmin, Ymax, Ymin) of the traffic circle obtained in S240. The relative quantities in this case are $\Delta X=Xmax-Xmin$ and $\Delta Y=Ymax-Ymin$.

Then, in the following S2720 it is determined whether or not a default value of the line width is greater than the relative quantities $\Delta X$, $\Delta Y$. When the default value of the line width is greater than the relative quantities $\Delta X$, $\Delta Y$ (S2720: YES), because as it is the inside of the traffic circle will collapse, in processing of S2730 and the followings the line width is reduced. Specifically, in S2730 the smaller of the relative quantities $\Delta X$, $\Delta Y$ is substituted for $\Delta L$ and in the following S2740 the line width is made $\Delta L-\alpha$. By this means, because a gap of $\alpha$ is secured inside the traffic circle it is possible to prevent it from collapsing.

However, when the line width becomes too small there is a possibility of it becoming impossible to see it when it is displayed. Accordingly, in S2750, it is determined whether or not the line width ($\Delta L-\alpha$) set in S2740 is smaller than a lowest guaranteed value. This lowest guaranteed value is the lowest value of line width at which a line can be seen when displayed. If the line width ($\Delta L-\alpha$) is smaller than the lowest guaranteed value (S2750: YES), the line width is changed to the lowest guaranteed value (S2760), and the present processing routine is ended and processing moves to S280 of FIG. 9.

In the case of a negative determination in the above-mentioned S2720, i.e. when the default value of the line width is below the relative quantities $\Delta X$, $\Delta Y$ (S2720: NO), or a negative determination in S2750, i.e. if the line width ($\Delta L-\alpha$) is equal to or greater than the lowest guaranteed value (S2750: NO), the present routine is ended directly and processing moves to S280.

In S280, to which processing moves after the processing of S270, with the center coordinates (Xc, Yc) of the traffic circle set in S250 as the display center, a map is drawn with the scale magnification R obtained in S260 and if necessary a drawn line width changed in S270.

Thus, with the route guidance apparatus 2 of this embodiment, for guidance intersections which are not included in traffic circles, the guidance intersection itself is made the display center and an enlarged map of for example 1/500 scale is used as it is for enlarged intersection display. On the other hand, when the guidance intersection belongs to a traffic circle, the center of the traffic circle is made the screen display center and adjustment performed so that the whole of that traffic circle lies within the screen display region and is displayed at above a predetermined size.

The sizes of traffic circles are various. For example when the circular route part is relatively large as shown in FIG. 14C, if enlarged intersection display is carried out using an enlarged map of 1/500 scale as it is, as shown in FIG. 14D, sometimes only a part of the traffic circle is displayed. This is because, since the connection part between the circular route of the traffic circle and the exit road is taken as an intersection, only the vicinities thereof are displayed. However, when the vehicle travels on the traffic circle, after entering the circular route, it is necessary for the user to travel recognizing how many ahead the exit road at which a turn should be made is. That is, unless not only the exit road alone but also the relative positional relationships and so on in the entire traffic circle are understood to the user, there is a possibility of not being able to distinguish which exit road to exit on.

According to the route guidance apparatus 2 of the second embodiment, enlarged intersection display with not the viewpoint "display the vicinity of the guidance intersection" but rather the viewpoint "display at a suitable size the entire traffic circle in which the guidance intersection is included" is carried out. Consequently, the user seeing that enlarged map can understand the relative positional relationships and so on of the exit roads in the entire traffic circle and can travel recognizing how many ahead after entering the circular route the exit road at which a turn should be made is. In this way, it is possible to automatically change the enlarged intersection view displayed on the map to a scale suited to the actual route guidance.

Figure 14A:
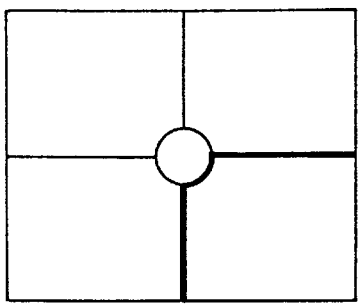
FIGS. 14A–14C are explanatory views showing display examples of a traffic circle produced by conventional intersection enlargement processing.
Figure 14B:
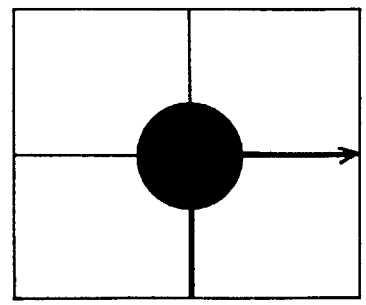
Figure 14C:
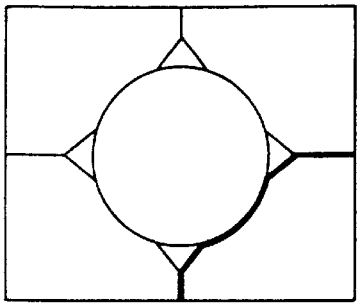
Figure 14D:
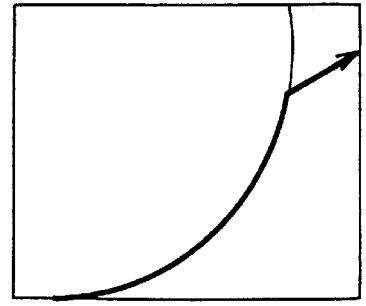

Also, the traffic circle shown in FIG. 14A is one whose circular route part is relatively small. It was discussed above that when enlarged display of this traffic circle is performed using an enlarged map of 1/500 scale as it is, there are cases where as shown in FIG. 14B the drawn line collapses. Therefore, it becomes impossible to distinguish the details of the traffic circle. With respect to this problem also, this route guidance apparatus 2, in cases wherein when a map image is enlarged and screen-displayed with a normal line width the inner side of the traffic circle collapses, reduces the line width used for the display (S2740 of FIG. 12). However, in cases wherein when screen display is carried out with a reduced line width it becomes invisible, screen display is carried out with a line width at a preset visible lowest guaranteed value (S2750, S2760 of FIG. 12).

(Third Embodiment)

In the second embodiment described above, a case wherein a traffic circle is considered as the complex intersection area is described. However, in this third embodiment, a case wherein a loop-shaped connecting road is considered as the complex intersection area will be described. For the overall construction of the route guidance apparatus for mounting in a vehicle 2 and the guide route setting processing and present position's vicinity map display processing executed by the control part 10, because they are the same as in the case of the second embodiment shown in FIG. 1 and FIG. 8, here a description will not be repeated.

In the processing that the control part 10 executes, enlarged intersection view display processing differing from the second embodiment will be described with reference to FIG. 15.

Figure 15:
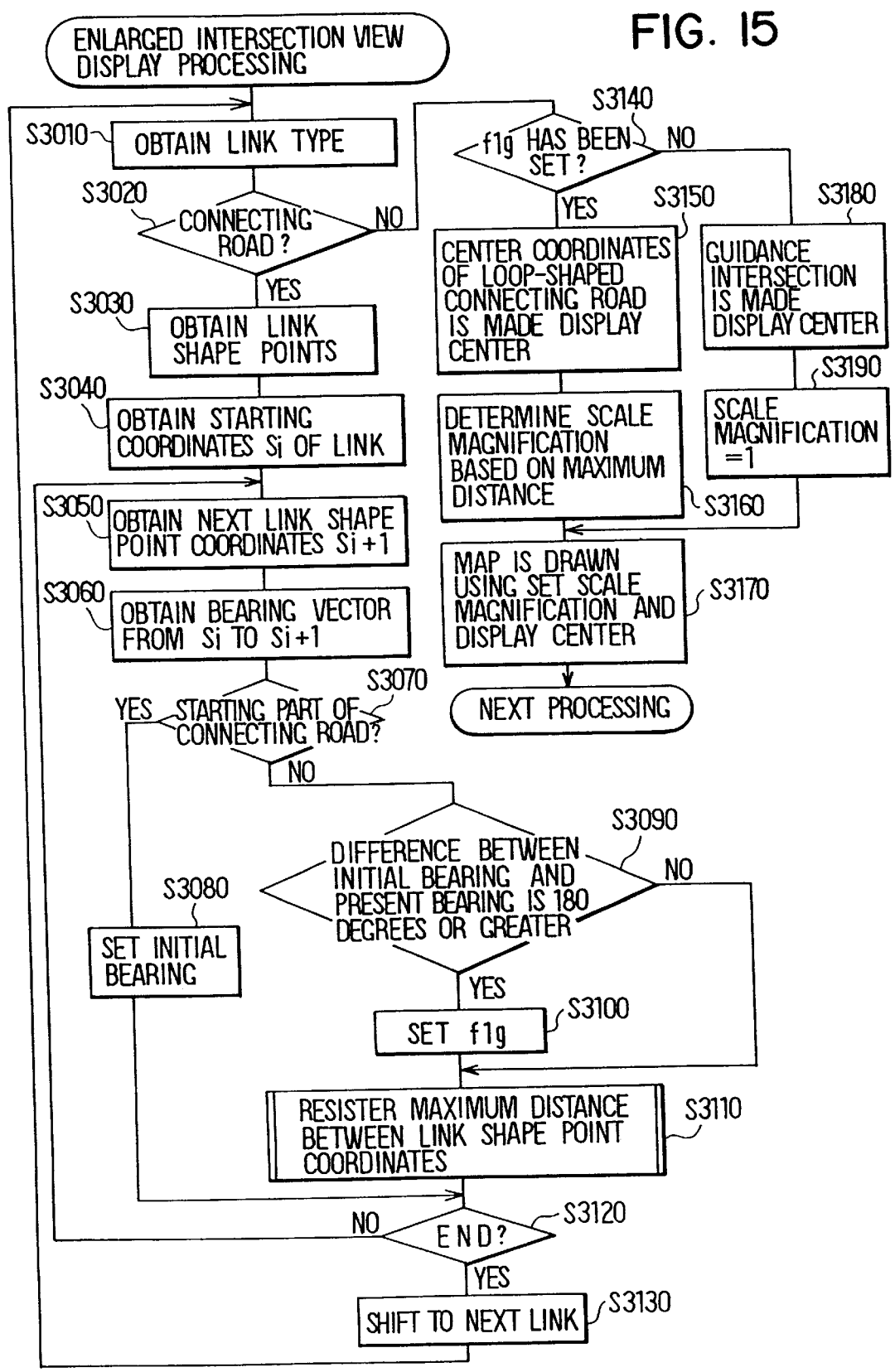
FIG. 15 is a flow chart showing enlarged intersection view display processing of a third embodiment.

In the enlarged intersection view display processing shown in FIG. 15, first the link type (link ID) is obtained (S3010). It is determined whether or not that link type is of an attribute of "Connecting Road" (S3020). As mentioned above, when a vehicle proceeds from a ground road to an elevated road, a road connecting those is a connecting road, and is called a rampway or the like. Here, whether or not that connecting road is loop-shaped is not a problem. That is, for roads connecting ground roads with elevated roads, IDs showing that all are connecting roads are set in the map data. Whether or not the connecting road is determined by referring to the IDs.

When a link corresponds to a road constituting a connecting road (S3020: YES), link shape points of the link constituting that connecting road are all obtained (S3030). Then, the starting link shape point coordinates Si of the link are obtained (S3040), and the next link shape point coordinates Si+1 of the link are obtained (S3050). A bearing vector from the starting link shape point coordinates Si to the next link shape point coordinates Si+1 is obtained (S3060).

When a part of the link from the starting coordinates Si to the next coordinates Si+1 is a starting part of a loop-shaped connecting road (S3070: YES), the bearing vector obtained in S3060 is set as an initial bearing (S3080), and processing proceeds to S3120. In S3120 it is determined whether processing of S3050 to S3110 has been carried out for all of the link shape points obtained in S3030. If the processing is not carried out for all of the link shape points (S3120: NO), processing returns to S3050.

On the other hand, if the part of the link is not a starting part (S3070: NO), it is determined whether the difference between the initial bearing set in S3080 and the bearing vector obtained in S3060, that is, the present bearing, is 180 degrees or greater. When the bearing difference is 180 degrees or greater (S3090: YES), after setting a flag (flg) (S3100), processing moves to S3110. If the bearing difference is less than 180 degrees (S3090: NO), processing proceeds directly to S3110.

In S3110, the maximum distance between link shape point coordinates is registered. This processing searches for, from combinations of all the shape points obtained up to that time, that of shape points between which distance is the greatest, and resisters the greatest distance. After the processing of S3110 processing proceeds to S3120. After the processing of S3050 through S3120 is repeated for the connecting road made up of a single link in this way (S3120: YES), processing proceeds to the next link (S3130), and returns to S3010.

Because there are cases wherein the connecting road is set in the map data so as to be constructed of a plurality of links even if it is actually a single connecting road, it may happen that in S3130 the next link is selected and the link type of the link obtained in S3010 becomes Connecting Road again (S3020: YES). In that case, the processing of S3030 and the followings is repeated.

When the link type obtained in S3010 is not Connecting Road (S3020: NO), processing proceeds to S3140 and determines whether the flag (flg) has been set. Because as described above the flag (flg) is set when the bearing difference from the initial bearing of the link is 180 degrees or more, when the flag (flg) has been set, it can be determined that it is a loop-shaped connecting road. On the other hand, when the flag (flg) has not been set, either it is not a connecting road or even if it is a connecting road it can be said that "it is not loop-shaped". That is, even when it has been decided that it is a connecting road (S3020: YES) and the processing of S3030 through S3120 has been executed, if the bearing difference from the initial bearing in the connecting road as a whole is less than 180 degrees, it is not determined to be a "loop-shaped connecting road".

When the flag (flg) has been set (S3140: YES), the center coordinates of the loop-shaped connecting road are made the display center (S3150). To calculate these center coordinates, the same method as in the case of the traffic circle of the second embodiment can be employed. That is, the maximum value Xmax and the minimum value Xmin of the X coordinates and the maximum value Ymax and the minimum value Ymin of the Y coordinates of the link(s) constituting the loop-shaped connecting road are obtained and the center coordinates (Xc, Yc) thereof are calculated by the following expression.

Xc=(Xmax+Xmin)/2, Yc=(Ymax+Ymin)/2

In the following S3160, a scale magnification is decided on the basis of the registered greatest distance. The processing pertaining to this scale magnification determination is similar to that by which the scale magnification was determined using the maximum diameter C in the case of the traffic circle of the second embodiment described above. That is, instead of the maximum diameter C, the greatest (maximum) distance is used. This is because, although since a traffic circle is circular the concept of a diameter can be applied thereto, since a loop-shaped connecting road is not circular, the concept of a maximum distance is used.

Figure 16:
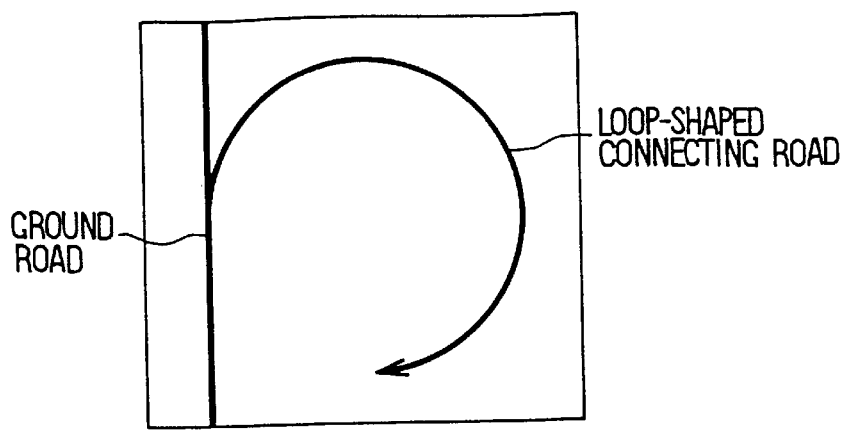
FIG. 16 is an explanatory view showing the outline of a loop-shaped connecting road displayed with the enlarged intersection view display processing of the third embodiment.

Then, according to the scale magnification determined in S3160 and the display center obtained in S3150, a map is drawn (S3170). An outline of the drawn map is shown in FIG. 16. The whole of the loop-shaped connecting road lies within the display screen.

On the other hand, when the flag (flg) has not been set (S3040: NO), the guidance intersection is displayed on the screen with the guidance intersection itself as the display center (S3180) while the scale magnification is made 1× (S3190). Therefore, in S3170, to which processing moves after the processing of S3190, a map of scale magnification 1× is drawn with the guidance intersection as the display center.

Figure 17A:
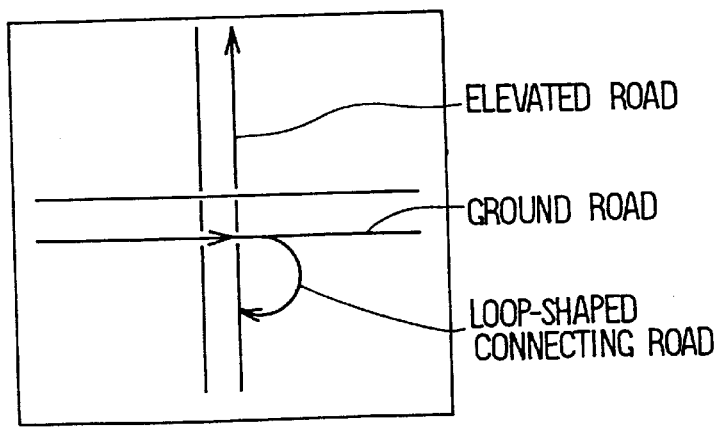
FIGS. 17A and 17B are explanatory views showing a display example of a loop-shaped connecting road produced by conventional intersection enlargement processing.
Figure 17B:
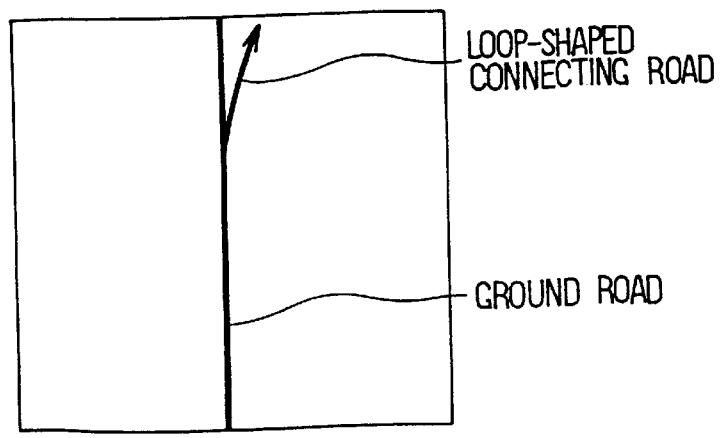

Thus, in the case of the third embodiment, when the guidance intersection belongs to a loop-shaped connecting road, adjustment is performed so that, with the center of the loop-shaped connecting road as the screen display center, the loop-shaped connecting road lies within the screen display region and is displayed at or above a predetermined size. The sizes of loop shapes of loop-shaped connecting roads are various. For example, the loop-shaped connecting road shown in FIG. 17A is one whose loop-shaped part is relatively large. When the loop-shaped connecting road shown in FIG. 17A is enlarged on a fixed scale and displayed, there are cases wherein only a part of the loop shape is displayed, as shown in FIG. 17B. When only a part of the loop-shaped connecting road is displayed as the diagonal branch at the entry part to a loop-shaped connecting road, there is a possibility that a driver wanting to proceed to a route connecting to the elevated road can not judge whether or not the diagonal branch displayed is really a loop-shaped connecting road. In the end, the driver may not understand which branch to turn at.

In contrast to this, in the case of the second embodiment, when a guidance intersection belongs to a loop-shaped connecting road, enlarged display with not the viewpoint "display the vicinity of the guidance intersection" but rather the viewpoint "display at a suitable size the entire loop-shaped connecting road in which the guidance intersection is included" can be realized. Consequently, the user seeing that enlarged map as shown in FIG. 16 can confirm that the loop-shaped connecting road displayed is the one connecting to the elevated road to which he wants to proceed, and can judge with confidence that he should turn at the diagonal branch displayed.

After the processing of S3160 of FIG. 15, as was carried out in the case of the traffic circle of the second embodiment, the processing of S270 of FIG. 9 for deciding the width of the drawn lines may be added.

(Other Embodiments)

In the second and third embodiment, when the enlarged view of the traffic circle or the loop-shaped connecting road is displayed on the screen of the display 14, the mark expressing the present position of the vehicle and the guidance route may be also displayed on the enlarged view.

Also, for example in the embodiments described above, as an example of a complex intersection area a traffic circle and a loop-shaped connecting road were considered. But besides these, complicated intersections can also be given as an example. For example, when a road of a small width and a road of a large width make a "diagonal T intersection" or a "diagonal crossing intersection" and also roads of large widths including such intersections make a "diagonal crossroads intersection", it is a situation such that a plurality of roads intersect complicatedly within a region of about 100 m in radius. In this case, since there are a plurality of intersections and they are intersecting diagonally and so on, when the vehicle actually travels through the vicinity of that complicated intersections, it is difficult for the user to make out the exact road to be travelled. That is, there is a possibility of it becoming impossible to distinguish which of the roads intersecting complicatedly within the above-mentioned region of about 100 m in radius the guide route is indicating. Accordingly, in this case also, with predetermined areas taken as those complicated intersections, it is possible to realize enlarged display with the viewpoint "display at a suitable size the entire complicated intersections". Consequently, the user seeing that enlarged map can easily grasp an exit road or the like on a set guide route from that complicatedly intersecting road situation. In this case also, it is preferable for the center of the complex intersection area to be made the screen display center.

Also, in the embodiments described above, in step S265 which executes the scale magnification acquisition processing shown in FIG. 11, the scale magnification R is calculated with the expression R=C/(D•A). The maximum diameter C is the larger of the X-axis direction diameter C1 and the Y-axis direction diameter C2 (S2610), and the display width for scale magnification calculation D is the smaller of (½)D2, (½)D1 (S2630, S2640). As a result, for example in the case of a rectangular display region, the maximum diameter of the traffic circle is made about ½ of the shorter display width. Of course if it is desired that the maximum diameter C of the traffic circle with respect to the display width D be made about ⅓, it is only necessary for the coefficient by which D2 or D1 is multiplied in S2630, S2640 to be made (⅓), or if it is to be made ⅗ then the coefficient should be made (⅗).

Also, as complex intersection areas, although in the second embodiment a traffic circle and in the third embodiment a loop-shaped connecting road are taken up individually, processing for both of these may be carried out. That is, in the enlarged intersection view display processing, processing corresponding to FIG. 9 is executed for a traffic circle and processing corresponding to FIG. 15 is executed for a connecting road. Finally display is carried out on the basis of the scale magnification and display center defined respectively.

Further, route guidance using a voice according to the first embodiment and route guidance using image display according to the second and third embodiments can be carried out together. In this case, because the user is informed of the exit road to be taken in, for example, the traffic circle by the voice as well as by the image display, it is possible to provide travel guidance appealing to sight and hearing of the user.

Although the invention has been described in its preferred embodiments, it is to be understood that the present invention is not limited to the embodiments as described above, and may be embodied in several forms without departing from the spirit and the scope as defined in the appended claims.

What is claimed is:

1. A route guidance apparatus comprising:

a voice generating device; and a guiding device for, every time a turning point for which guidance is to be provided existing on a route for reaching a destination is approached, providing travel guidance for the turning point by at least a voice generated from the voice generating device, wherein when the turning point for which guidance is to be provided is included in a traffic circle and the route turns to an exit road toward an outer side of the traffic circle therefrom at the turning point, the guiding device provides travel guidance specifying a number of the exit roads toward the outer side of the traffic circle from a current position to a target turning point for which the guidance is to be provided among exit roads toward the outer side of the traffic circle, wherein, when the turning point for which guidance is to be provided is included in the traffic circle and the route turns to an exit road toward an inner side of the traffic circle therefrom at the turning point, the guiding device provides travel guidance specifying a number of the exit roads toward the inner side of the traffic circle from a current position to a target turning point for which the guidance is to be provided among exit roads toward the inner side of the traffic circle.

2. A route guidance apparatus according to claim 1, wherein a turn angle of each of the exit roads toward the inner and outer sides of the traffic circle is set with a traffic direction on a circular route constituting the traffic circle as a reference, and the guiding device specifies the exit road toward the inner side or the exit road toward the outer side with respect to each of the exit roads based on the turn angle.

3. A route guidance apparatus according to claim 1, further comprising:

a display device for displaying characters and figures on its screen, wherein the guiding device provides travel guidance not only by a voice generated from the voice generating device but also by image display in the display device.

4. A route guidance apparatus comprising:

a voice generating device; and a guiding device for, every time a turning point for which guidance is to be provided existing on a route for reaching a destination is approached, providing travel guidance for the tuning point by at least a voice generated from the voice generating device, wherein when the turning point for which guidance is to be provided is included in a traffic circle and the route turns to an exit road toward an outer side of the traffic circle therefrom at the turning point, the guiding device provides travel guidance specifying a number of the exit roads toward the outer side of the traffic circle from a current position to a target turning point for which the guidance is to be provided among exit roads toward the outer side of the traffic circle, wherein the guiding device provides travel guidance as to a distance to the traffic circle and number of exit road to be taken after entering the traffic circle at a predetermined distance before entering the traffic circle, and then provides travel guidance as to the number of exit road to be taken immediately before entering the traffic circle.

5. A route guidance apparatus comprising:

a present position detecting device for detecting a present position;

a destination setting device for setting a destination on the basis of an operation of a user;

a map data storing device for storing map data;

a route data selecting device for selecting route data corresponding with a route from the present position detected by the present position detecting device to the destination set by the destination setting device from the map data stored in the map data storing device;

a voice generating device; and a guiding device for, every time a turning point for which guidance should be provided exists on the route is approached, providing travel guidance for the turning point by at least a voice generated from the voice generating device, wherein when the turning point for which guidance is to be provided is included in a traffic circle and the route turns from the traffic circle to an exit road toward an outer side thereof at the turning point, the guiding device provides travel guidance specifying a number of the exit roads toward the outer side of the traffic circle from a current position to a target turning point for which the guidance is to be provided among exit roads toward the outer side of the traffic circle, wherein, when the turning point for which guidance is to be provided is included in the traffic circle and the route turns to an exit road toward an inner side of the traffic circle therefrom at the turning point, the guiding device provides travel guidance specifying a number of the exit roads toward the inner side of the traffic circle from a current position to a target turning point for which the guidance is to be provided among exit roads toward the inner side of the traffic circle, and wherein a turn angle of each of the exit roads toward the inner and outer sides of the traffic circle is set with a traffic direction on a circular route constituting the traffic circle as a reference, and the guiding device specifies the exit road toward the inner side or the exit road toward the outer side with respect to each of the exit roads based on the turn angle.

6. A route guidance apparatus comprising:

a present position detecting device for detecting a present position;

a destination setting device for setting a destination on the basis of an operation of a user;

a map data storing device for storing map data;

a route data selecting device for selecting route data corresponding with a route from the present position detected by the present position detecting device to the destination set by the destination setting device from the map data stored in the map data storing device;

a voice generating device; and a guiding device for, every time a turning point for which guidance should be provided exists on the route is approached, providing travel guidance for the turning point by at least a voice generated from the voice generating device, wherein when the tuning point for which guidance is to be provided is included in a traffic circle and the route turns from the traffic circle to an exit road toward an outer side thereof at the turning point, the guiding device provides travel guidance specifying a number of the exit roads toward the outer side of the traffic circle from a current position to a target turning point for which the guidance is to be provided among exit roads toward the outer side of the traffic circle, wherein the guiding device provides travel guidance as to a distance to the traffic circle and a number of exit road to be taken after entering the traffic circle at a predetermined distance before entering the traffic circle, and then provides travel guidance as to the number of exit road to be taken immediately before entering the traffic circle.

7. A route guidance apparatus according to claim 6, further comprising:

a display device for displaying characters and figures on its screen, wherein the guiding device provides travel guidance not only by a voice generated from the voice generating device but also by image display in the display device.

8. A route guidance apparatus comprising:

a present position detecting device for detecting a present position;

a destination setting device for setting a destination on the basis of an operation of a user;

a map data storing device for storing map data;

a route data selecting device for selecting route data corresponding with a route from the present position detected by the present position detecting device to the destination set by the destination setting device from the map data stored in the map data storing device;

a voice generating device; and a guiding device for, every time a turning point for which guidance should be provided exists on the route is approached, providing travel guidance for the turning point by at least a voice generated from the voice generating device, wherein when the turning point for which guidance is to be provided is included in a traffic circle and the route turns from the traffic circle to an exit road toward an outer side thereof at the turning point, the guiding device provides travel guidance specifying a number of the exit roads toward the outer side of the traffic circle from a current position to a target turning point for which the guidance is to be provided among exit roads toward the outer side of the traffic circle, wherein a turn angle of each of the exit roads toward the inner and outer sides of the traffic circle with a traffic direction on a circular route constituting the traffic circle as a reference is used as data concerning toward which of an inner side and an outer side of the traffic circle each of the links corresponding to the exit roads extends, the turn angle being expressed along with a sign of plus or minus depending on toward which of an inner side and an outer side of the traffic circle each of the links extends.

9. A route guidance apparatus according to claim 8, wherein the guiding device find a number of exit road to be taken after entrance of the traffic circle by counting the links of the exit roads given with the turn angle satisfying a predetermined searching condition while excluding the links given with the circle attribute.

10. A route guidance apparatus comprising:

a present position detecting device for detecting a present position;

a destination setting device for setting a destination on the basis of an operation of a user;

a map data storing device for storing map data;

a route data selecting device for selecting route data corresponding with a route from the present position detected by the present position detecting device to the destination set by the destination setting device from the map data stored in the map data storing device;

a voice generating device; and a guiding device for, every time a turning point for which guidance should be provided exists on the route is approached, providing travel guidance for the turning point by at least a voice generated from the voice generating device, wherein when the turning point for which guidance is to be provided is included in a traffic circle and the route turns from the traffic circle to an exit road toward an outer side thereof at the turning point, the guiding device provides travel guidance specifying a number of the exit roads toward the outer side of the traffic circle from a current position to a target turning point for which the guidance is to be provided among exit roads toward the outer side of the traffic circle, further comprising;

a route displaying device for, during travel of a vehicle, extracting a map and a guide route in the vicinity of a vehicle present position from the map data and the route data, and displaying on a screen a map image including the map and the guide route in the vicinity of the vehicle present position and a vehicle present position mark, thereby carrying out route guidance from the departure point to the destination; and an enlarged map displaying device for displaying on the screen an enlarged map image including a map and a guide route in the vicinity of the turning point, when the turning point for which guidance is to be provided exists on the guide route is approached, wherein when the turning point for which guidance is to be provided belongs to the traffic circle, the enlarged map displaying device adjusts a degree of enlargement of the map image so that an entire traffic circle lies in a display region of the screen and is displayed at above a predetermined size.

11. A route guidance apparatus according to claim 10, wherein the map data storing device stores map data expressing a predetermined area on severally different scales and the enlarged map displaying device uses a map of the largest scale among the map data for display of the enlarged map image in the vicinity of the turning point, and when the turning point for which guidance is to be provided belongs to the traffic circle, the enlarged map displaying device enlarges or reduces the enlarged map image drawn by using the map of the largest scale.

12. A route guidance apparatus according to claim 10, wherein a traffic circle attribute is set for nodes and links constituting the traffic circle in the map data, and when a node corresponding to the turning point for which guidance is to be provided has the traffic circle attribute, the enlarged map displaying device finds a shape of the traffic circle by searching for links having the traffic circle attribute with a link including the node corresponding to the turning point and having the traffic circle attribute as a starting point until searched links makes a circular route.

13. A route guidance apparatus according to claim 12, wherein the enlarged map displaying device displays the enlarged map image so that the traffic circle lies in the display region and is displayed at above the predetermined size on the basis of a maximum straight line distance between the nodes included in the traffic circle and a size of the display region.

14. A route guidance apparatus according to claim 10, wherein the enlarged map displaying device displays the enlarged map image so that a center of the traffic circle is made a display center of the screen.

15. A route guidance apparatus according to claim 10, wherein, when the enlarged map image of the traffic circle is displayed with a default line width, if an inner side of the traffic circle collapses, a line width for drawing the traffic circle is reduced.

16. A route guidance apparatus according to claim 15, wherein, when the traffic circle which is drawn with the line width reduced becomes invisible as map image, a predetermined visible minimum line width is used for drawing the traffic circle.

17. A route guidance apparatus according to claim 10, wherein the enlarged map displaying device displays the enlarged map image so that an entrance route to the traffic circle is positioned in the vicinity of a lower end of the display region.

18. A route guidance apparatus comprising:
a map data storing device for storing map data;
a route data storing device for storing guide route data connecting a departure point to a destination, which is set with reference to map data stored by the map data storing device;
a present position detecting device for detecting a present position of a vehicle;
a route guiding device for, during travel of a vehicle, extracting a map and a guide route in the vicinity of a vehicle present position from the map data and the guide route data, and displaying on a screen a map image including the map and the guide route in the vicinity of the vehicle present position and a vehicle present position mark, thereby carrying out route guidance from the departure point to the destination; and
an enlarged map displaying device for displaying an enlarged map image including a map and a guide route in the vicinity of a turning point, when the turning point for which guidance is to be provided existing on the guide route is approached, wherein
when the turning point for which guidance is to be provided belongs to a predetermined complex intersection area, the enlarged map displaying device adjusts a degree of enlargement of the map image so that an entire complex intersection area lies in a display region of the screen and is displayed at above a predetermined size,
wherein the complex intersection area includes a traffic circle, and
wherein a traffic circle attribute is set for nodes and links constituting the traffic circle, and when a node corresponding to the turning point for which guidance is to be provided has the traffic circle attribute, the enlarged map displaying device finds a shape of the traffic circle by searching for links having the traffic circle attribute with a link including the node corresponding to the turning point and having the traffic circle attribute as a starting point until searched links makes a circular route.

19. A route guidance apparatus according to claim 18, wherein the map data storing device stores map data expressing a predetermined area on severally different scales and the enlarged map displaying device uses a map of the largest scale among the map data for display of the enlarged map image in the vicinity of the turning point, and when the turning point for which guidance is to be provided belongs to the predetermined complex intersection area, the enlarged map displaying device enlarges or reduces the enlarged map image drawn by using the map of the largest scale.

20. A route guidance apparatus according to claim 18, wherein, when the complex intersection area is either one of a traffic circle and a loop-shaped connecting road, the enlarged map displaying device displays the enlarged map image so that a center of either one of the traffic circle and the loop-shaped connecting road is made a display center of the screen.

21. A route guidance apparatus according to claim 18, wherein, when the complex intersection area is either one of a traffic circle and a loop-shaped connecting road, the enlarged map displaying device displays the enlarged map image so that either one of the traffic circle and the loop-shaped connecting road lies in the display region and is displayed at above the predetermined size on the basis of a maximum straight line distance of either one of the traffic circle and the loop-shaped connecting road and a size of the display region.

22. A route guidance apparatus according to claim 18, wherein, when the complex intersection area is either one of a traffic circle and a loop-shaped connecting road and the enlarged map image thereof is displayed with a default line width, if an inner side of either one of the traffic circle and the loop-shaped connecting road collapses, a line width for drawing either one of the traffic circle and the loop-shaped connecting road is reduced.

23. A route guidance apparatus according to claim 22, wherein, when either one of the traffic circle and the loop-shaped connecting road which is drawn with the line width reduced becomes invisible as map image, a predetermined visible minimum line width is used for drawing either one of the traffic circle and the loop-shaped connecting road.

24. A route guidance apparatus according to claim 18, wherein the enlarged map displaying device displays the enlarged map image so that an entrance route to the complex intersection area is positioned in the vicinity of a lower end of the display region.

25. A route guidance apparatus comprising:
a map data storing device for storing map data;
a route data storing device for storing guide route data connecting a departure point to a destination, which is set with reference to map data stored by the map data storing device;
a present position detecting device for detecting a present position of a vehicle;
a route guiding device for, during travel of a vehicle, extracting a map and a guide route in the vicinity of a vehicle present position from the map data and the guide route data, and displaying on a screen a map image including the map and the guide route in the vicinity of the vehicle present position and a vehicle present position mark, thereby carrying out route guidance from the departure point to the destination; and
an enlarged map displaying device for displaying an enlarged map image including a map and a guide route in the vicinity of a turning point, when the turning point for which guidance is to be provided existing on the guide route is approached, wherein
when the turning point for which guidance is to be provided belongs to a predetermined complex intersection area, the enlarged map displaying device adjusts a degree of enlargement of the map image so that an entire complex intersection area lies in a display region of the screen and is displayed at above a predetermined size,
a route guidance apparatus according to claim 22, wherein the complex intersection area includes a loop-shaped connecting road for connecting a ground road to an elevated road in a three-dimensional intersection structure, and
wherein a loop-shaped connecting road attribute is set for nodes and links constituting the loop-shaped connecting road, and when a node corresponding to the turning point for which guidance is to be provided has the loop-shaped connecting road attribute, the enlarged map displaying device finds a shape of the loop-shaped connecting road by successively searching for links having the loop-shaped connecting road attribute with a link including the node corresponding to the turning point and having the loop-shaped connecting road attribute as a starting point until a termination of the loop-shaped connecting road.

26. A route guidance apparatus according to claim 25, wherein plural link shape points are set on the link constituting the loop-shaped connecting road, the shape of the loop-shaped connecting road is found based on bearing vectors of neighboring link shape points.

27. A route guidance apparatus comprising:

a map data storing device for storing map data;

a route data storing device for storing guide route connecting a departure point to a destination, which is set with reference to map data stored by the map data storing device;

a present position detecting device for detecting a present position of a vehicle;

a route guiding device for, during travel of a vehicle, extracting a map and a guide route in the vicinity of a vehicle present position from the map data and the guide route data, and displaying on a screen a map image including the map and the guide route in the vicinity of the vehicle present position and a vehicle present position mark, thereby caring out route guidance from the departure point to the destination; and an enlarged map displaying device for displaying an enlarged map image including a map and a guide route in the vicinity of a turning point, when the turning point for which guidance is to be provided existing on the guide route is approached, wherein when the turning point for which guidance is to be provided belongs to a predetermined complex intersection area, the enlarged map displaying device adjusts a degree of enlargement of the map image so that an entire complex intersection area lies in a display region of the screen and is displayed at above a predetermined size, wherein the complex intersection area includes a traffic circle, and further comprising:

a voice generating device, and a guiding device for, every time the turning point for which guidance should be provided existing on the route is approached, provided travel guidance for the turning point by least a voice generated from the voice generating device, wherein when the turning point for which guidance is to be provided is included in the traffic circle and the route turns from the traffic circle to an exit road toward an outer side thereof at the turning point, the guiding device provides travel guidance specifying how many ahead the exit road to be taken is among exit roads toward the outer side of the traffic circle, when the turning point for which guidance is to be provided is included in the traffic circle and the route turns from the traffic circle to an exit road toward an inner side thereof at the turning point, the guiding device provides travel guidance specifying how many ahead the exit road to be taken is among exit roads toward the inner side of the traffic circle, wherein a turn angle of each of the exit roads toward the inner and outer sides of the traffic circle is set with a traffic direction on a circular route constituting the traffic circle as a reference, and the guiding device specifies the exit road toward the inner side or the exit road toward the outer side with respect to each of the exit roads based on the turn angle.

28. A route guidance apparatus comprising:

a map data storing device for storing map data;

a route data storing device for storing guide route connecting a departure point to a destination, which is set with reference to map data stored by the map data storing device;

a present position detection device for detecting a present position of a vehicle;

a route guiding device for, during travel of a vehicle, extracting a map and a guide route in the vicinity of a vehicle present position from the map data and the guide route data, and displaying on a screen a map image including the map and the guide route in the vicinity of the vehicle present position and a vehicle present position mark, thereby carrying out route guidance from the departure point to the destination; and an enlarged map displaying device for displaying an enlarged map image including a map and a guide route in the vicinity of a turning point, when the turning point for which guidance is to be provided existing on the guide route is approached, wherein when the turning point for which guidance is to be provided belongs to a predetermined complex intersection area, the enlarged map displaying device adjusts a degree of enlargement of the map image so that an entire complex intersection area lies in a display region of the screen and is displayed at above a predetermined size, wherein the complex intersection area includes a traffic circle, and further comprising:

a voice generating device; and a guiding device for, every time the turning point for which guidance should be provided existing on the route is approached, provided travel guidance for the turning point by least a voice generated from the voice generating device, wherein when the turning point for which guidance is to be provided is included in the traffic circle and the route turns from the traffic circle to an exit road toward an outer side thereof at the turning point, the guiding device provides travel guidance specifying how many ahead the exit road to be when is among exit roads toward the outer side of the traffic circle, wherein the guiding device provides travel guidance as to a distance to the traffic circle and a number of exit road to be taken after entering the traffic circle at a predetermined distance before entering the traffic circle, and further provides travel guidance as to the number of exit road to be taken immediately before entering the traffic circle.

29. A route guidance apparatus comprising:

a map data storing device for storing map data;

a route data storing device for storing guide route connecting a departure point to a destination, which is set with reference to map data stored by the map data storing device;

a present position detecting device for detecting a present position of a vehicle;

a route guiding device for, during travel of a vehicle, extracting a map and a guide route in the vicinity of a vehicle present position from the map data and the guide route data, and displaying on a screen a map image including the map and the guide route in the vicinity of the vehicle present position and a vehicle present position mark, thereby caring out route guidance from the departure point to the destination; and an enlarged map displaying device for displaying an enlarged map image including a map and a guide route in the vicinity of a turning point, when the turning point for which guidance is to be provided existing on the guide route is approached, wherein when the turning point for which guidance is to be provided belongs to a predetermined complex intersection area, the enlarged map displaying device adjusts a degree of enlargement of the map image so that an entire complex intersection area lies in a display region of the screen and is displayed at above a predetermined size, wherein the complex intersection area includes a traffic circle and further comprising:

a voice generating device; and a guiding device for, every time the turning point for which guidance should be provided existing on the route is approached provided travel guidance for the turning point by least a voice generated from the voice generating device, wherein when the turning point for which guidance is to be provided is included in the traffic circle and the route turns from the traffic circle to an exit road toward an outer side thereof at the turning point, the guiding device provides travel guidance specifying how many ahead the exit road to be when is among exit roads toward the outer side of the traffic circle wherein the route data is structured by nodes expressing intersections of the route and links connecting between neighboring nodes, and the nodes and links constituting the traffic circle are given with a traffic circle attribute, and each of the links corresponding to the exit roads branching from a circular part of the traffic circle is given with data concerning toward which of an inner side and an outer side of the traffic circle each of the links extends.

30. A route guidance apparatus according to claim 29, wherein a turn angle of each of the exit roads toward the inner and outer sides of the traffic circle with a traffic direction on a circular route constituting the traffic circle as a reference is used as data concerning toward which of an inner side and an outer side of the traffic circle each of the links corresponding to the exit roads extends, the turn angle being expressed along with a sign of plus or minus depending on toward which of an inner side and an outer side of the traffic circle each of the links extends.

31. A route guidance apparatus according to claim 30, wherein the guiding device find a number of exit road to be taken after entrance of the traffic circle by counting the links of the exit roads given with the turn angle satisfying a predetermined searching condition while excluding the links given with the traffic circle attribute.

* * * * *